United States Patent

Sasaki

Patent Number: 5,283,610
Date of Patent: Feb. 1, 1994

[54] CAMERA SYSTEM HAVING COMMUNICATION FUNCTION BETWEEN CAMERA MAIN BODY AND FLASH DEVICE

[75] Inventor: Toyoji Sasaki, Tokyo, Japan

[73] Assignee: Olympus Optical Co., Ltd., Tokyo, Japan

[21] Appl. No.: 33,032

[22] Filed: Mar. 18, 1993

[30] Foreign Application Priority Data

Mar. 23, 1992 [JP] Japan ................................ 4-65306
Oct. 5, 1992 [JP] Japan ................................ 4-266348

[51] Int. Cl.$^5$ .......................................... G03B 15/05
[52] U.S. Cl. ........................................ 354/416; 354/131
[58] Field of Search ............... 354/413, 416, 417, 131, 354/145.1

[56] References Cited

U.S. PATENT DOCUMENTS

| | | | |
|---|---|---|---|
| 3,259,042 | 7/1966 | Kagan | 354/131 |
| 4,284,338 | 8/1981 | Ikuno | 354/416 |
| 4,298,260 | 11/1981 | Takayama | 354/416 X |
| 4,591,762 | 5/1986 | Nakamura | 315/241 P |

FOREIGN PATENT DOCUMENTS

| | | |
|---|---|---|
| 49-33633 | 3/1974 | Japan . |
| 49-62125 | 6/1974 | Japan . |
| 54-115223 | 9/1979 | Japan . |
| 54-115224 | 9/1979 | Japan . |
| 56-70538 | 6/1981 | Japan . |
| 57-56830 | 4/1982 | Japan . |
| 59-222821 | 12/1984 | Japan . |

*Primary Examiner*—W. B. Perkey
*Attorney, Agent, or Firm*—Frishauf, Holtz, Goodman & Woodward

[57] ABSTRACT

A camera system includes a camera main body, a transmitter for transmitting a signal to a flash device, a single communication path between the camera main body and the flash device, and a receiver for receiving a signal from the transmitter. The signal received by the receiver is selectively switched by a selector in the receiver in accordance with communication control data or emission control data with respect to the flash device. The selector switches the communication path to the emission control side only when data representing that the communication path is used as a signal path for emission control data with respect to the flash device is transmitted.

27 Claims, 21 Drawing Sheets

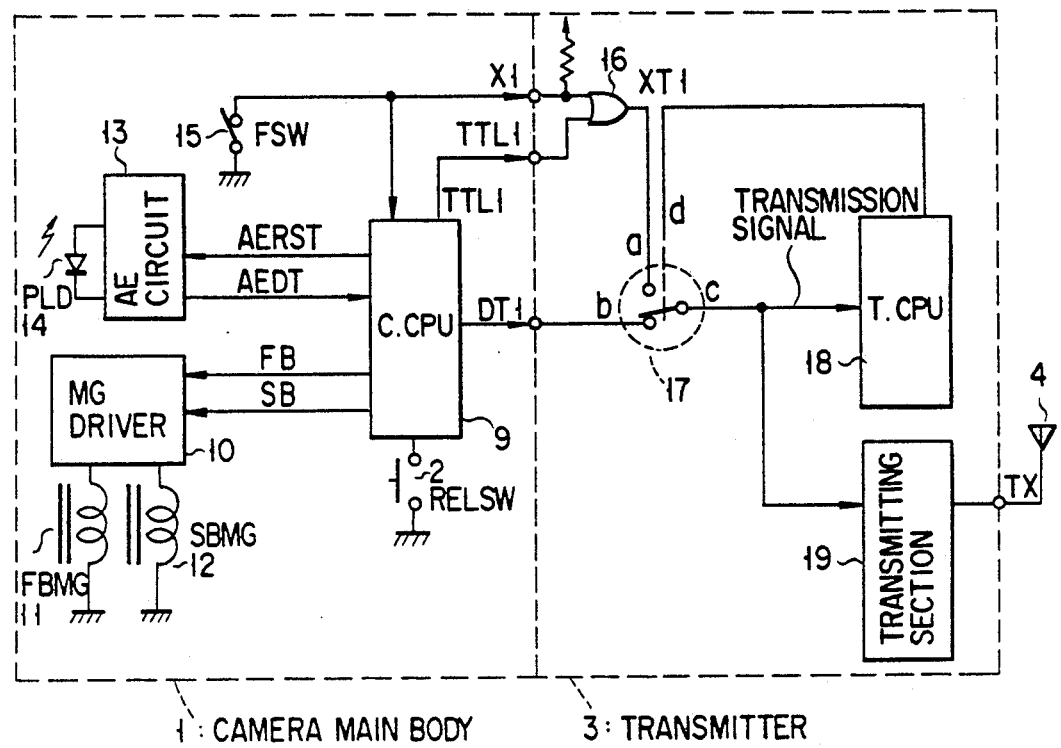
F I G. 1A
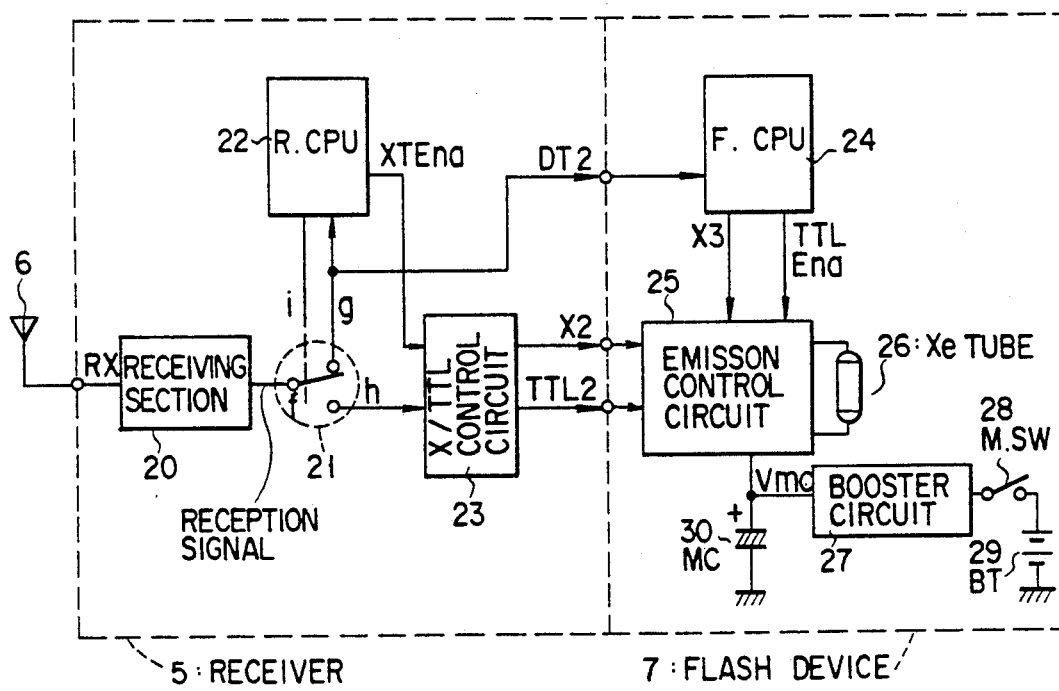
F I G. 1B

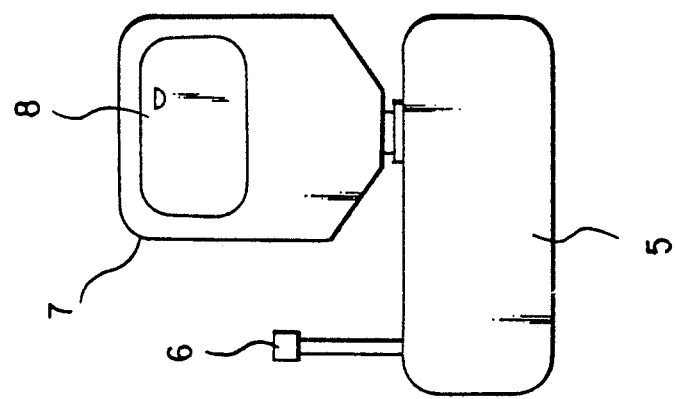
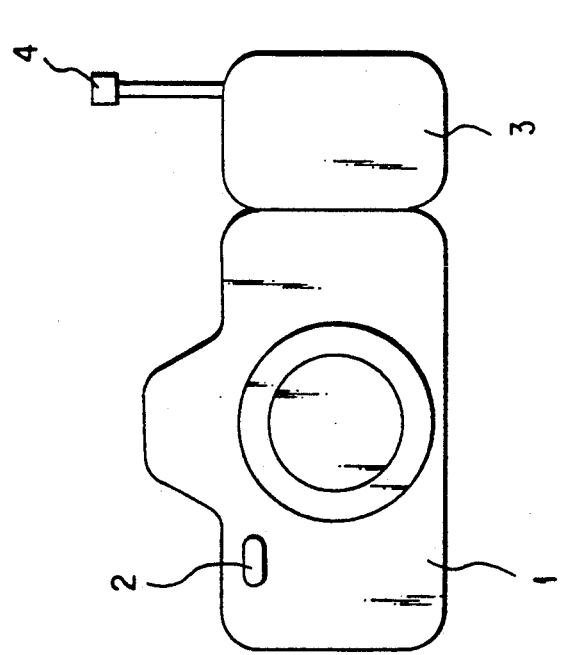
FIG. 2A
FIG. 2B

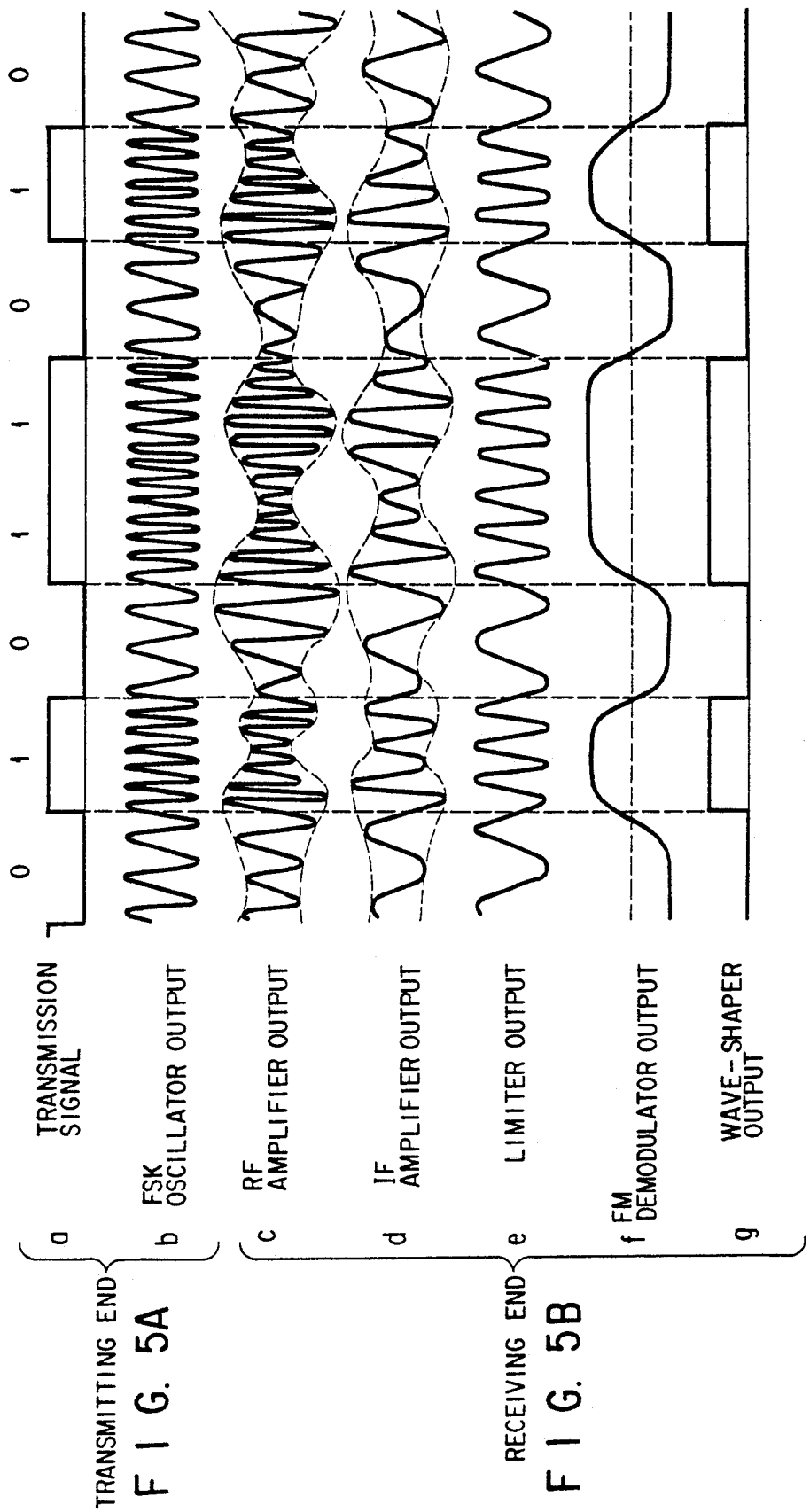

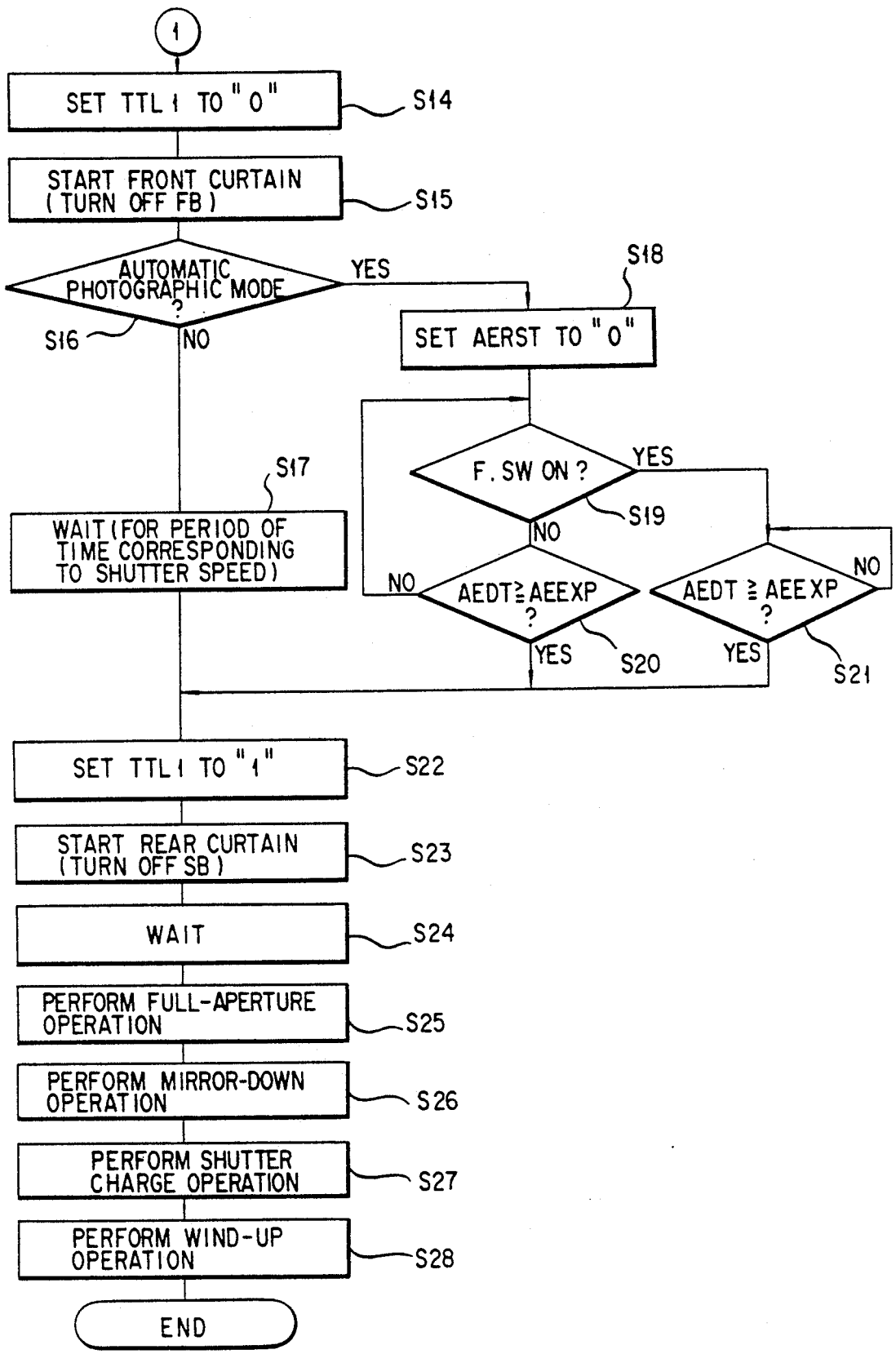
F I G. 8

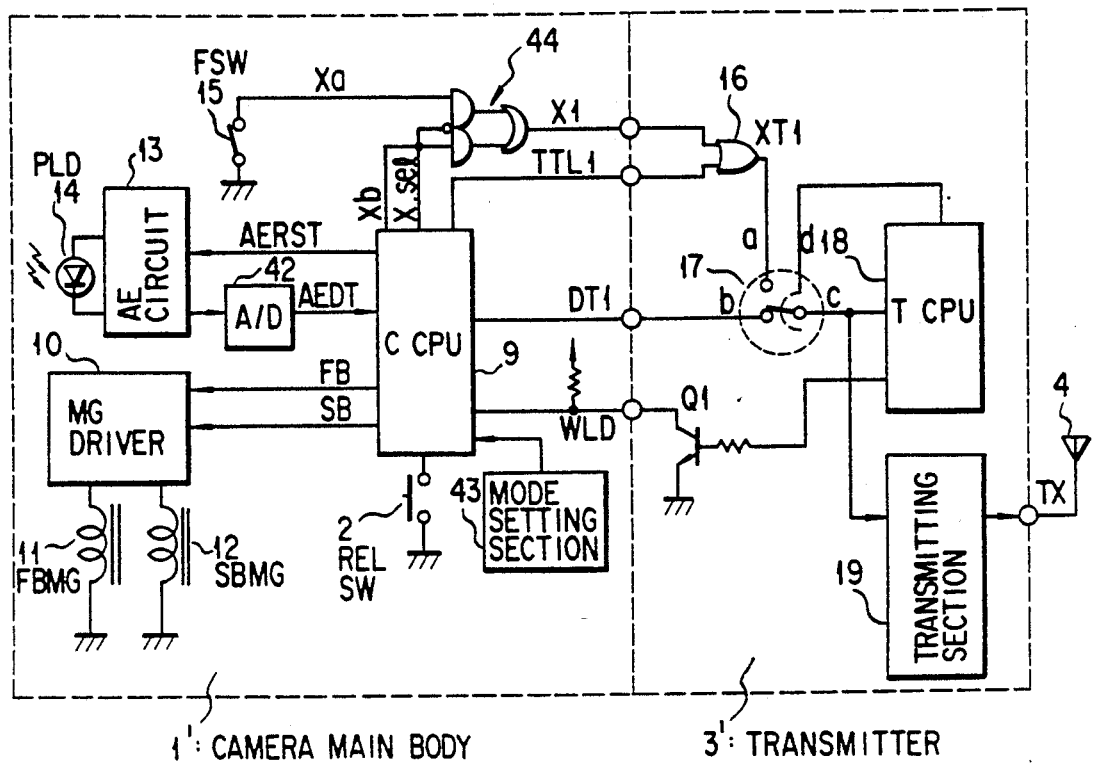
F I G. 13A
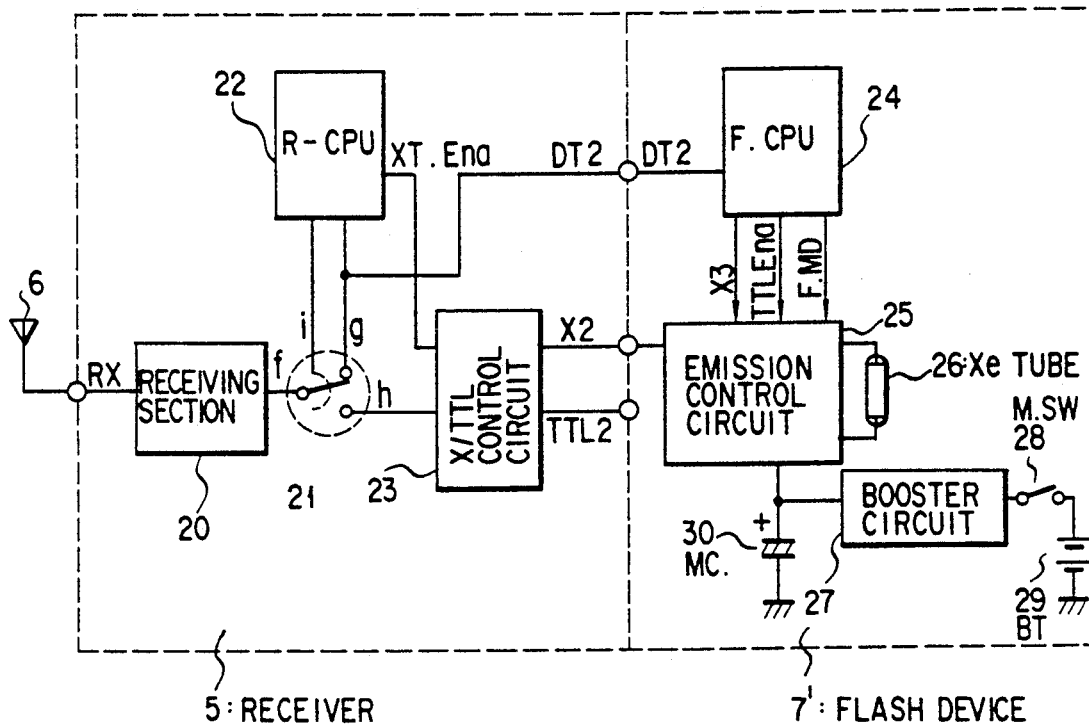
F I G. 13B

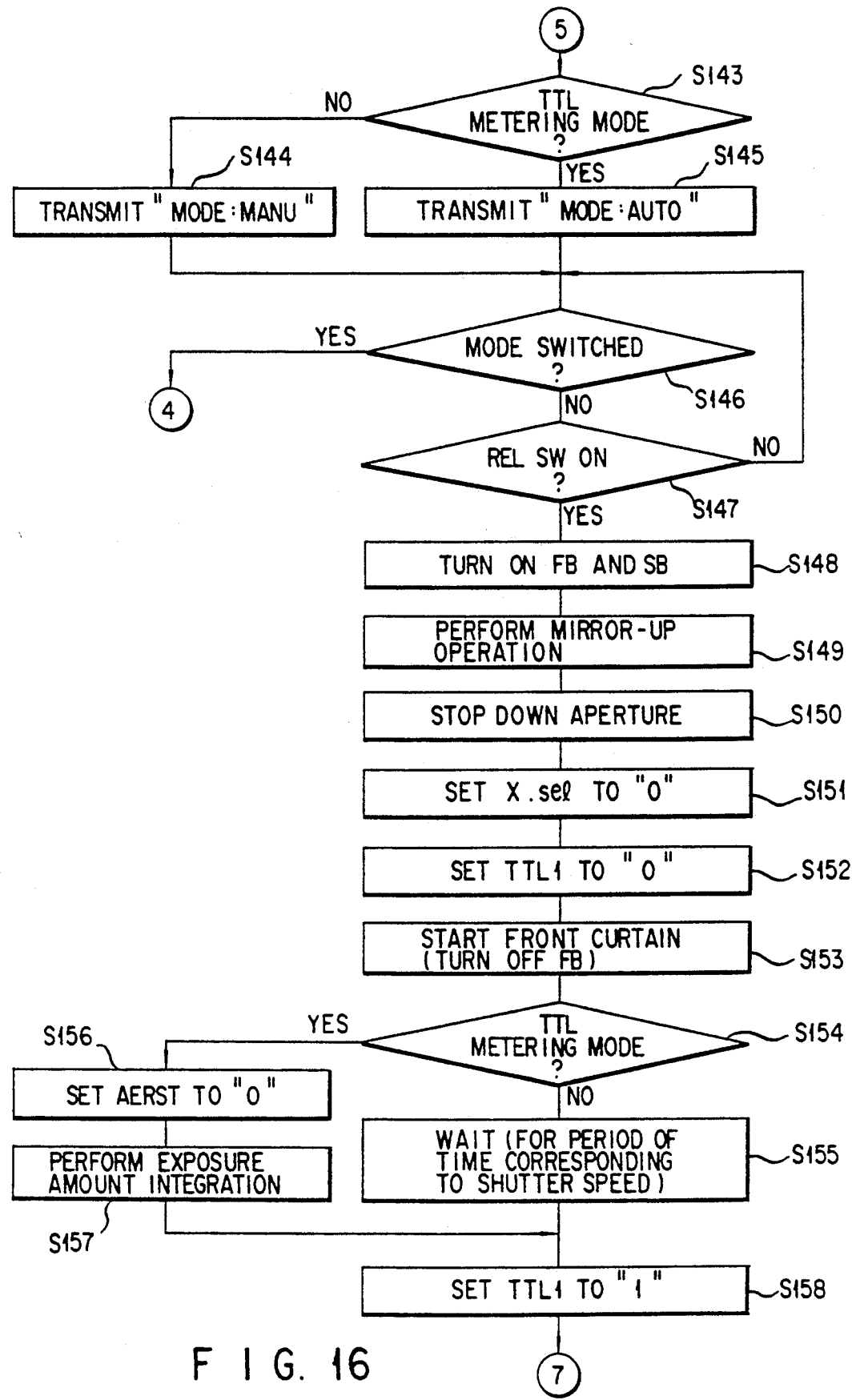
F I G. 16

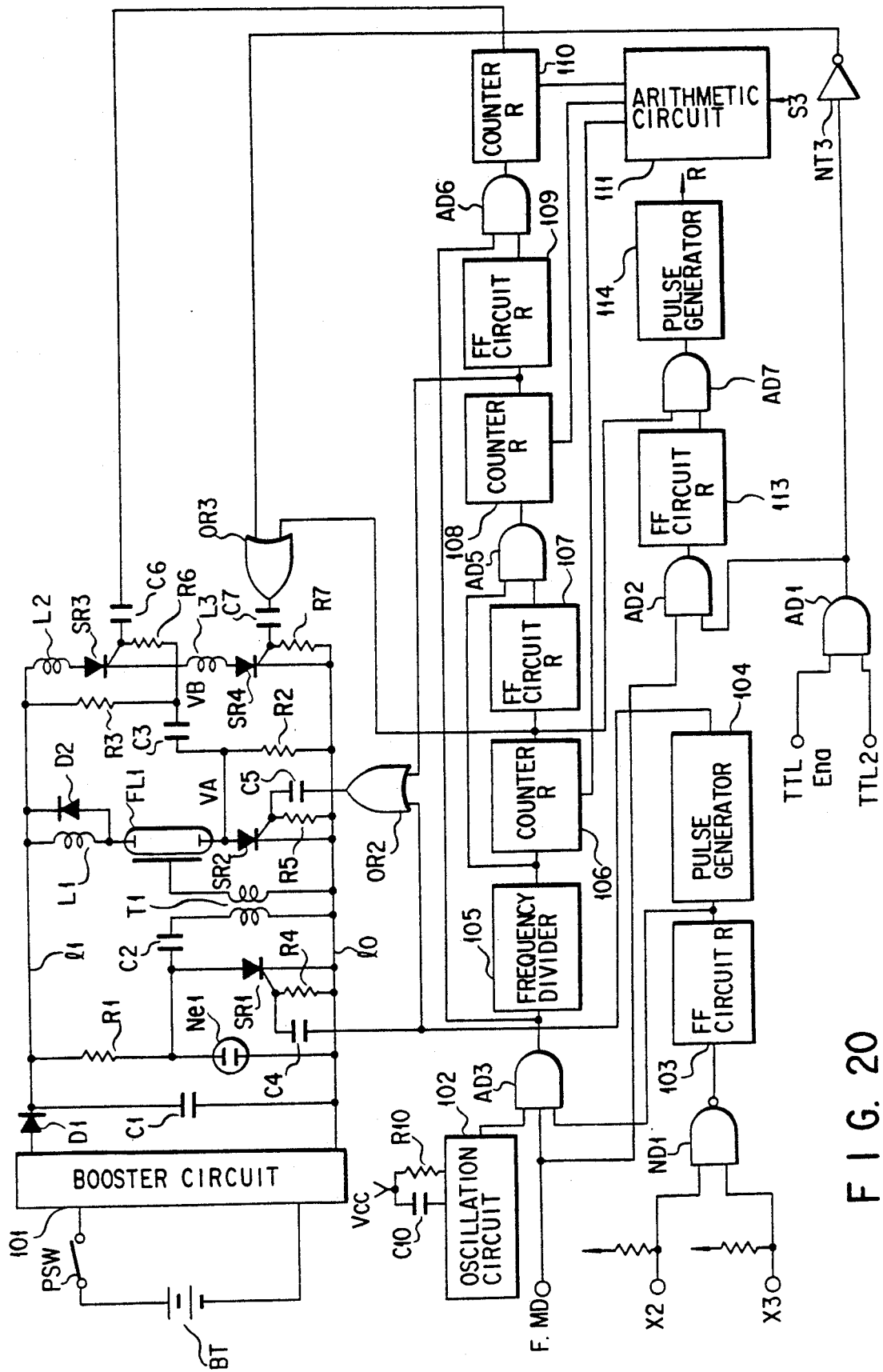
F I G. 20

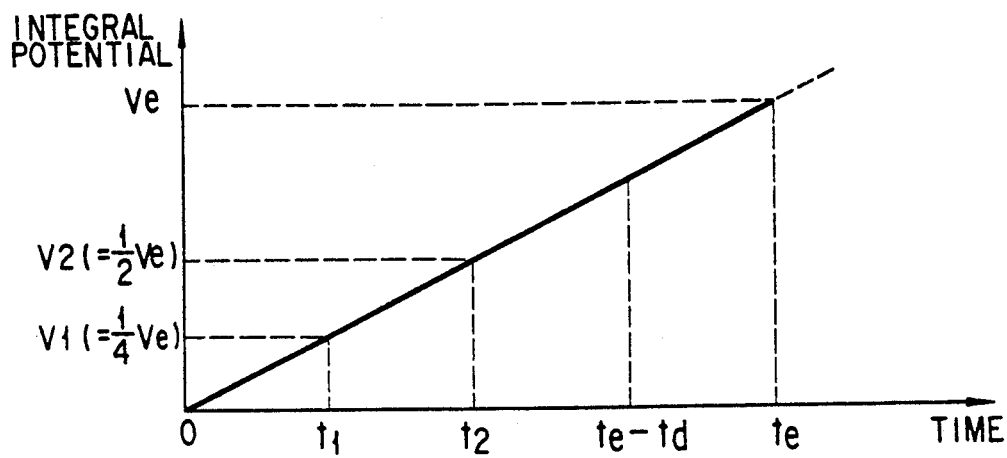
F I G. 22
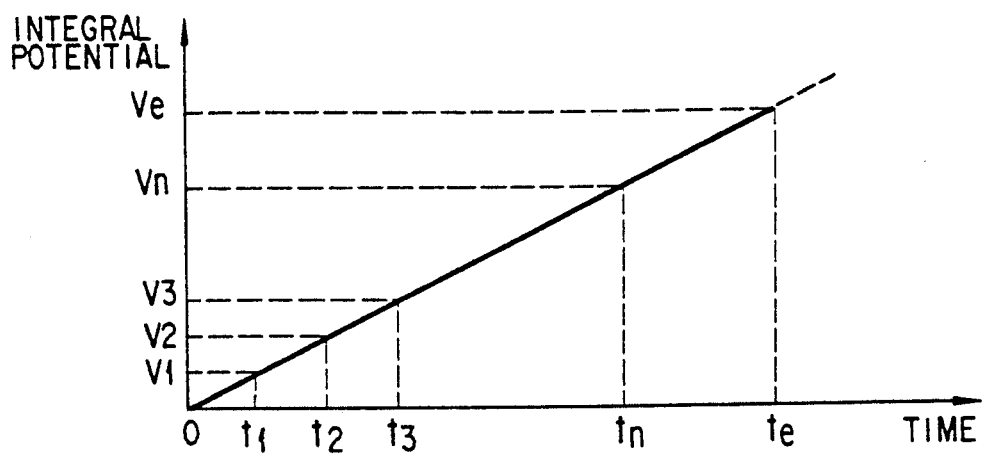
F I G. 23

CAMERA SYSTEM HAVING COMMUNICATION FUNCTION BETWEEN CAMERA MAIN BODY AND FLASH DEVICE

BACKGROUND OF THE INVENTION

1. Field of the Invention

The present invention generally relates to a camera system and, more particularly, to a camera system which is constituted by a camera main body and a flash device between which the exchange of control signals, as data communication, is performed, and which is designed to decrease the number of signal lines between the camera main body and the flash device.

2. Description of the Related Art

When photography is to be performed by using a flash device, the device is either mounted (clipped) on a camera main body or is installed separately from the camera main body. When the flash device and the camera main body are placed at different positions, a cord is often used as a signal path for transmitting a control signal from the camera main body to the flash device so as to cause the flash device to produce flashlight.

If, however, a cord is used, a cumbersome wiring operation is required. In addition, as the user or the like tries to walk over the cord, he/she may catch his/her foot on the cord, thus damaging the camera main body or the flash device.

If, for example, emission control on the flash device is performed by radio using radio waves, infrared rays, visible light, or the like, no such inconvenience is caused.

If the flash device is placed at a position separated from the camera main body, every time a set value (emission mode, radiation angle, or the like) of the flash device is to be changed, the user must go to the installation position of the flash device to manually change the set value. This operation requires much time and labor. In order to avoid such a troublesome operation, the use of a signal path for data communication, in addition to a signal path for emission control, has been proposed. More specifically, when an operation of changing a set value of the flash device is performed on the camera main body side, the corresponding information is transmitted from the camera main body to the flash device through the signal path for data communication. The flash device then changes the set value on the basis of the information.

In order to realize this data communication, a camera system may be constructed, in which a radio signal path using electric waves, infrared rays, visible light, or the like is formed between a camera main body and a flash device, and proper modulation and demodulation are performed, like a system in which a plurality of computers communicate with each other through, e.g., telephone lines as signal paths, by modulating/demodulating signals using a modem.

A camera system having such an arrangement, however, requires at least two signal paths. In addition, such a camera system requires two circuits for demodulation and modulation, and hence an increase in cost is inevitable. In addition, an increase in the size of each device cannot be avoided.

Furthermore, in a camera system using signal paths such as radio stations for data communication, the number of usable signal paths (channels) is limited, besides channels are regarded as public resources. Therefore, it is undesirable to occupy two channels. In order to avoid this, communication for emission control and data communication may be performed through one signal path. However, communication for emission control must be performed in real time.

If an emission command and an emission stop command are communicated as data between the camera main body and the flash device, a time delay occurs. When, for example, an 8-bit signal as data is to be transmitted from the camera main body, since each transmission data requires a start bit and a stop bit, a period of time corresponding to at least 10 bits is required. Provided that the transmission rate is 1,200 bps, a time delay of at least 8.3 msec is caused. In such a camera system, therefore, the following problems are posed owing to this time delay: (i) an asynchronous curtain operation is caused unless the shutter speed is set to be sufficiently low, and (ii) an emission stop command cannot be transmitted, in effect, with a time delay of 8.3 msec, because the flash device produces flashlight within several msec upon reception of an emission command.

SUMMARY OF THE INVENTION

It is, therefore, an object of the present invention to provide a new and improved camera system in which communication of emission control and data communication can be performed between a camera main body and a flash device through one signal path in real time.

According to the present invention, there is provided a camera system comprising: a camera main body; a flash device; transmission means, arranged in the camera main body, for transmitting a signal including at least one of a data communication signal and an emission control signal to the flash device; a single communication path through which the signal is transmitted from the camera main body to the flash device; reception means, arranged in the flash device, for receiving the signal transmitted from the transmission means through the single communication path; emission driving means, arranged in the flash device, for driving the flash device to emit flashlight; communication control means arranged in the reception means and having a communication control function; first switching means, arranged in the transmission means, for selectively transmitting one of the data communication signal and the emission control signal of the signals output from the camera main body; second switching means, arranged in the reception means, for selectively outputting the signal, transmitted from the transmission means to one of the communication control means and the emission driving means; first control means, arranged in the transmission means, for normally setting the first switching means to a data communication signal side, and switching the first switching means to an emission control signal side when the communication path is used as a path for emission control on the flash device; and second control means, arranged in the reception means, for normally setting the second switching means to a communication control means side, and switching the second switching means to an emission driving means side when data representing that the communication path is used as the path for emission control on the flash device is transmitted from the transmission means.

In the camera system of the present invention, one signal path is set between the camera main body and the flash device, and the signal path is normally used for data communication. When flashlight is to be produced by the flash device, data communication is performed in advance to declare that the signal path is used for emission control. Thereafter, emission and emission stop operations are performed in real time by using the signal path. In addition, when the use of the signal path for emission control is declared as described above, the function of the signal path is restored to that of data communication after the elapse of a predetermined period of time. Furthermore, in order to meet the demand for the expansion of the system, the restoration time required to restore the function of the signal path for emission control to that of data communication can be set by data communication.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A and 1B show the first embodiment of the present invention, in which FIG. 1A is a block diagram showing a schematic arrangement of a camera main body and a transmitter, and FIG. 1B is a block diagram showing a schematic arrangement of a receiver and a flash device;

FIGS. 2A and 2B show a camera system of the present invention, in which FIG. 2A is a perspective view of the camera main body and the transmitter, and FIG. 2B is a perspective view of the receiver and the flash device;

FIGS. 5A and 5B show signals used for data communication between the transmitter and the receiver, in which FIG. 5A shows the waveforms of signals at the transmitting end, and FIG. 5B shows the waveforms of signals at the receiving end;

FIG. 8 is a flow chart for explaining an operation of the CCPU 9 in the camera main body 1;

FIGS. 13A and 13B show another embodiment of the present invention, in which FIG. 13A is a block diagram showing a schematic arrangement of a camera main body and a transmitter, and FIG. 13B is a block diagram showing a schematic arrangement of a receiver and a flash device;

FIG. 16 is a flow chart for explaining an operation of the CCPU 9 in the camera main body 1';

FIG. 20 is a block diagram showing a circuit arrangement of the flash device 7';

FIG. 22 is a graph showing changes in integral potential as a function of time to explain a first photometric prediction method; and FIG. 23 is a graph showing changes in integral potential as a function of time to explain a second photometric prediction method.

DETAILED DESCRIPTION OF THE PREFERRED EMBODIMENTS

Figure 3:
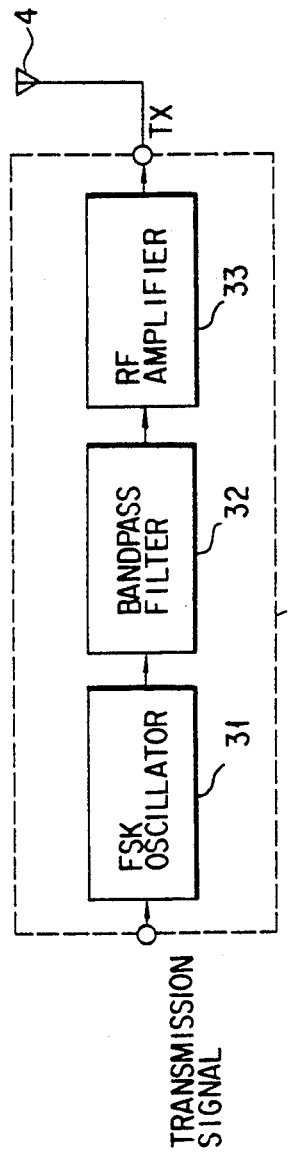
FIG. 3 is a block diagram showing the arrangement of a transmitting section 19.

Reference will now be made in detail to the presently preferred embodiments of the invention as illustrated in the accompanying drawings, in which like reference characters designate like or corresponding parts throughout the several drawings.

FIGS. 2A and 2B are perspective views of a camera main body, a flash device, and their peripheral devices of a camera system according to the first embodiment of the present invention. Referring to FIG. 2A, reference numeral 1 denotes a camera main body exemplifying the body of a single-lens reflex camera. The camera main body 1 has a release switch (RELSW) 2. Photography is performed by turning on the RELSW 2. A detachable transmitter 3 is mounted on the camera main body 1. A contact terminal (not shown) for exchanging various types of signals is formed on the attaching/detaching portion for the transmitter 3.

The transmitter 3 is a camera accessary which can be detachably mounted on the camera main body 1. The transmitter 3 can perform radio communication with a receiver 5 detachably mounted on a flash device (to be described later). For example, a fixed antenna 4 is set on an outer portion of the transmitter 3. Data or an emission control signal from the camera main body 1 is FM-modulated and transmitted to the receiver 5 (FIG. 2B) by radio through the antenna 4.

An antenna 6 for receiving an FM signal transmitted from the transmitter 3 is fixed on an outer portion of the receiver 5 in FIG. 2B. With this arrangement, the FM signal is extracted and demodulated into the original signal. In addition, the receiver 5 includes a hot shoe (not shown) for allowing flash device 7 to be mounted. Data and an emission control signal are output to the flash device 7 through the contact terminal of the hot shoe.

The flash device 7 has a function of causing emission of flashlight and stopping the emission, and can perform test emission. A light-emitting portion 8 is formed on the front surface of the flash device 7.

FIGS. 1A and 1B are block diagrams schematically showing the camera main body, the flash device, and their peripheral devices in FIGS. 1A and 1B. FIG. 1A shows the camera main body 1 and the transmitter 3. FIG. 1B shows the receiver 5 and the flash device 7.

Referring to FIG. 1A, the camera main body 1 incorporates a camera CPU (CCPU) 9 as a portion for controlling an operation of the camera main body, which CPU also serves to communicate with other accessaries. The CCPU 9 monitors an ON/OFF operation of the RELSW 2, and ON/OFF-controls a front curtain magnet (FBMG) 11 and a rear curtain magnet (SBMG) 12 through a MG driver 10 via control signal lines FB and SB. The FBMG 11 and the SBMG 12 are magnets for locking the front and rear curtains, and the MG driver 10 serves as a driver for driving the two magnets. These magnets are ON/OFF-controlled by control signals supplied from the CCPU 9 through the control signal lines FB and SB.

An automatic exposure (AE) circuit 13 starts to perform integration of currents flowing in a photometric diode (PLD) 14 connected to the AE circuit 13 when a photometric integral value reset signal AERST from the CCPU 9 is canceled, i.e., set at low (L) level. The AE circuit 13 then outputs the integral value (photometric integral value) as an analog value AEDT to the CCPU 9.

A front curtain switch (FSW) 15 is a switch which is turned on when traveling of the front curtain is completed. In this case, when the FSW 15 is turned on, an output signal is set at L level. Note that this switch signal is output as an emission signal X1.

The CCPU 9 also monitors an ON/OFF operation of the FSW 15, and outputs an emission stop signal from a contact terminal TTL1 and controls the light amount by TTL (through the taking lens) scheme. In addition, the CCPU 9 monitors the output value AEDT from the AE circuit 13.

The transmitter 3 is connected to the camera main body 1 through a contact terminal X1, the contact terminal TTL1, and a contact terminal DT1. The AE circuit 13 is constituted by an OR circuit 16, a selector 17, a transmission CPU (TCPU) 18, a transmitting section 19, and the antenna 4 connected to the transmitting section 19 through a contact terminal XT.

The selector 17 has fixed terminals a and b, a switching terminal c, and a control terminal d. As a transmission signal output from the selector 17, either an output XT1 from the OR circuit 16 or an output from the contact terminal DT1 is selected under the control of the TCPU 18. When the terminal d is set at L level, the terminals b and c are connected to each other. When the terminal d is set at high (H) level, the terminals a and c are connected to each other.

A transmission signal output from the terminal c is monitored by the TCPU 18 and is transmitted to the transmitting section 19, in which the transmission signal is FM-modulated (modulated into a binary FSK signal in this case) and RF-amplified. Thereafter, the electrical signal is converted into an electromagnetic wave by the antenna 4 set on the outer portion of the transmitter 3 through the terminal TX.

Referring to FIG. 1B, the receiver 5 is constituted by a receiving section 20, a selector 21, a reception CPU (RCPU) 22, and an X/TTL control circuit 23, which are connected to the antenna 6, set on the outer portion of the receiver 5, through the contact terminal RX.

The electromagnetic wave transmitted from the antenna 4 of the transmitter 3 in FIG. 1A is received by the antenna 6 and converted into an electrical signal. The electrical signal is then input to the receiving section 20 through the terminal RX to be FM-demodulated into the original signal The selector 21 has a switching terminal f, fixed terminals g and h, and a control terminal i. The switching terminal f is switched to output a reception signal to the RCPU 22 and a contact terminal DT2 (connection between the terminals f and g) or the X/TTL control circuit 23 (connection between the terminals f and h) under the control of the RCPU 22. When the control terminal i is set at L level, the terminals f and g are connected to each other. When the control terminal i is set at H level, the terminals f and h are connected to each other.

The RCPU 22 is a CPU incorporated in the receiver 5 and receives a reception signal through the selector 21. In addition, the RCPU 22 performs X/TTL permission/inhibition control through a terminal XTEna of the X/TTL control circuit 23 and controls a switching operation of the selector 21.

In addition, the X/TTL control circuit 23 outputs an emission signal and an emission stop signal from contact terminals X2 and TTL2. When the terminal XTEna is set at L level, the signals output from the terminals X2 and TTL2 are forcibly set in an OFF state (i.e., inhibition state). When the terminal XTEna is set at H level, these signals are enabled. After the terminal XTEna is set at H level, the signal from the terminal X2 is turned on at the first trailing edge of a signal from the selector 21, while the signal from the terminal TTL2 is turned on at the first leading edge of the signal from the selector 21.

The flash device 7 is constituted by a flash CPU (FCPU) 24, an emission control circuit 25, a booster circuit 27, and the like.

The FCPU 24 is a CPU incorporated in the flash device 7. The FCPU 24 receives and loads serial data from a terminal DT2. The FCPU 24 controls lines X3 (a transmission signal for test emission or the like) and TTLEna (TTL emission control enable signal) with respect to the emission control circuit 25 on the basis of the received data.

The emission control circuit 25 has a xenon (Xe) tube 26 and controls an emission or emission stop operation of the Xe tube 26 in accordance with signals from the terminals X2 and TTL2. In addition, the booster circuit 27 boosts a voltage applied from a battery (BT) 29 through a switch 28, and charges a main capacitor (MC) 30 with the boosted voltage.

FIG. 3 is a block diagram showing the arrangement of the transmitting section 19 in FIG. 1A. Referring to FIG. 3, the transmitting section 19 is constituted by an FSK (Frequency Shift Keying) oscillator 31, a bandpass filter 32, and an RF amplifier 33 for power-amplifying a carrier wave (RF signal). The FSK oscillator 31 outputs a signal having a frequency $f_0$ or $f_1$ in accordance with a digital value of 0 or 1, thus performing modulation. The bandpass filter 32 serves to cut unnecessary signal components to perform efficient transmission. The bandpass filter 32 is constituted by a bandpass filter. The signal amplified by the RF amplifier 33 is output from the antenna 4 through the terminal TX.

Figure 4:
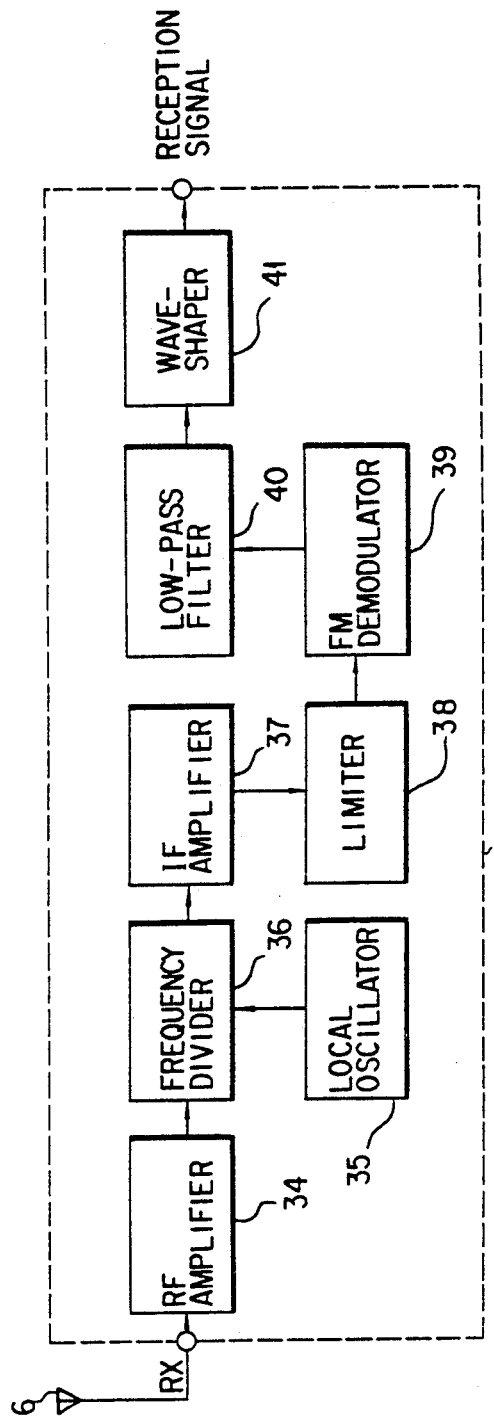
FIG. 4 is a block diagram showing the arrangement of a receiving section 20.

FIG. 4 is a block diagram showing the arrangement of the receiving section 20 in FIG. 1B. Referring to FIG. 4, a weak RF signal obtained by the antenna 6 is amplified by an RF amplifier 34 and is converted into an IF signal by a local oscillator 35 and a frequency converter 36. This IF signal is amplified by an IF amplifier 37. The amplification value of the IF signal is then adjusted to a predetermined value by a limiter 38. The frequency-modulated signal is then converted (demodulated) into an amplitude by an FM demodulator 39. The high-frequency components of the signal are then cut by a low-pass filter 40 to obtain a low-frequency signal. Thereafter, the low-frequency signal is wave-shaped by a wave-shaper 41 to be converted into the original digital value.

Data communication between the transmitting section 19 and the receiving section 20 will be described next with reference to the timing charts shown in FIGS. 5A and 5B.

The transmission signal (a) shown in FIG. 5A is a digital signal constituted by "0" and "1" at the transmitting end. The output (b) from the FSK oscillator 31 shown in FIG. 5A is a signal having the frequency $f_0$ or $f_1$ depending on whether the transmission signal is "0" or "1". For the sake of descriptive convenience, the output (b) in FIG. 5A represents a case wherein $f_1 = 2 f_0$. In practice, however, both the frequencies $f_0$ and $f_1$ are several tens to several hundreds MHz, and $\Delta f = f_1 - f_0$ is several kHz to several tens kHz.

Signals (c) to (g) in FIG. 5B have the illustrated waveforms at the receiving end. Since a signal received by the receiving section 20 includes noise or distortions, the amplitude value varies, as indicated by an output (c) from the RF amplifier 34 in FIG. 5B. The RF signal output from the RF amplifier 34 is converted into an IF signal (e.g., 10.7 MHz) by the local oscillator 35 and the frequency converter 36. The IF signal is then amplified by the IF amplifier 37 to become a signal (d) as shown in FIG. 5B.

If the amplitude of the above-mentioned signal is not constant value, the resultant modulated signal is distorted. For this reason, the amplitude of the signal is adjusted by the limiter 38, as a signal (e) shown in FIG. 5B. The amplitude-adjusted signal is demodulated by the FM demodulator 39 to have a waveform (f) as shown in FIG. 5B. Thereafter, the signal is filtered by the low-pass filter 40 to obtain a low-frequency signal. When this low-frequency signal is wave-shaped by the wave-shaper 41, the original digital signal such as a signal (g) shown in FIG. 5B is obtained. This signal is a reception signal.

Data communication will be described below with reference to FIGS. 6A and 6B.

Figure 6A:
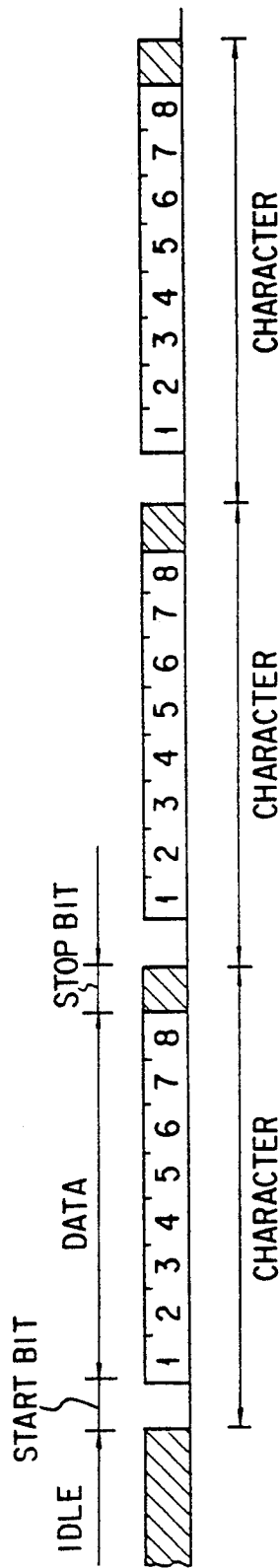
FIG. 6A is a view showing data processed in normal data communication.

In normal data communication, as shown in FIG. 6A, an NRZ (Non Return-to-Zero) technique is used as a data coding technique.

As indicated by the hatched portions in FIG. 6A, while no data communication is performed, an idle value, i.e., "1", is output. Data is transmitted in ASCII code in units of characters, each consisting of 10 bits. One character is constituted by a start bit ("0"), data (8-bit ASCII code), and a stop bit ("1").

Assume that a command signal for test emission is to be transmitted in data communication. In this case, a command "TEST:ON" is transmitted. Therefore, "TEST:ON[CR][LF]" (assume that [CR] represents a data delimiter; and [LF], line feed), i.e., a total of 9 characters, are sequentially transmitted. These characters are represented by the following ASCII codes: 54, 45, 53, 54, 3A, 4F, 3B, 0D, and 0A (hexadecimal notation).

The receiving end sequentially receives these characters. Upon reception of "[CR][LF]", the receiving end detects the end of the statement, and recognizes the received data as the test emission command "TEST:ON". Note that the description of the exchange of "[CR]" and "[LF]" will be omitted hereinafter.

Assume that the following commands are prepared in addition to the above command in this embodiment:

"MODE:AUTO" indicating automatic mode photography (an emission stop mode performed by means of a TTL);

"MODE:MANU" indicating manual mode photography (a full emission mode); and

"TIME:* (* is a numerical value)" indicating a command to set a data communication restoration time Tx.

Figure 6B:
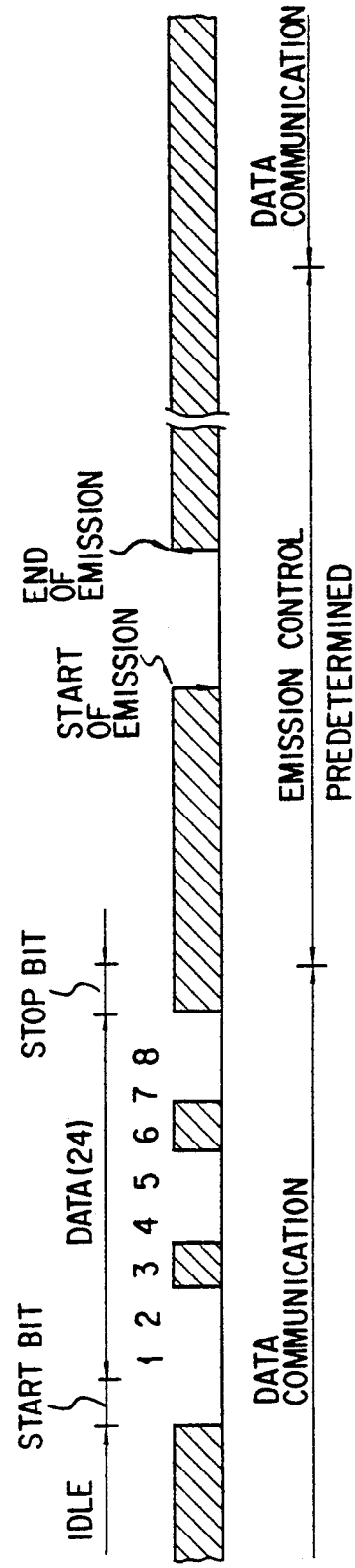
FIG. 6B is a view showing data processed in data communication for emission control.

Communication for emission control is performed in the manner shown in FIG. 6B.

In this case, "$" ("24" in ASCII code) is a declarator for a shift to the emission control mode. When "$" is transmitted, as the first character, in normal data communication, the transmitter 3 and the receiver 5 perform switching to the signal path for emission control.

In the emission control mode, in the transmitter 3, an output X1 for determining an emission start timing and an output TTL1 for determining an emission stop timing are synthesized with each other to form a signal having a waveform such as the one shown in FIG. 6B. That is, emission is started at the trailing edge of the signal, and the emission is stopped at the next leading edge of the signal. This synthetic signal is separated into an emission start output X2 and an emission stop output TTL2 by the X/TTL control circuit 23 in the receiver 5.

When the data communication restoration time Tx elapses, the TCPU 18 and the FCPU 24 in the transmitter 3 and the receiver 5 automatically restore the signal path to the signal path for data communication. Although this restoration time Tx is set to be 0.5 sec as a default value, the value can be changed by transmitting "TIME:* (* is a numerical value)" in data communication.

An operation of each CPU will be described next with reference to FIGS. 7 to 12.

An operation of the CCPU 9 in the camera main body 1 will be described first with reference to the flow charts in FIGS. 7 and 8.

Figure 7:
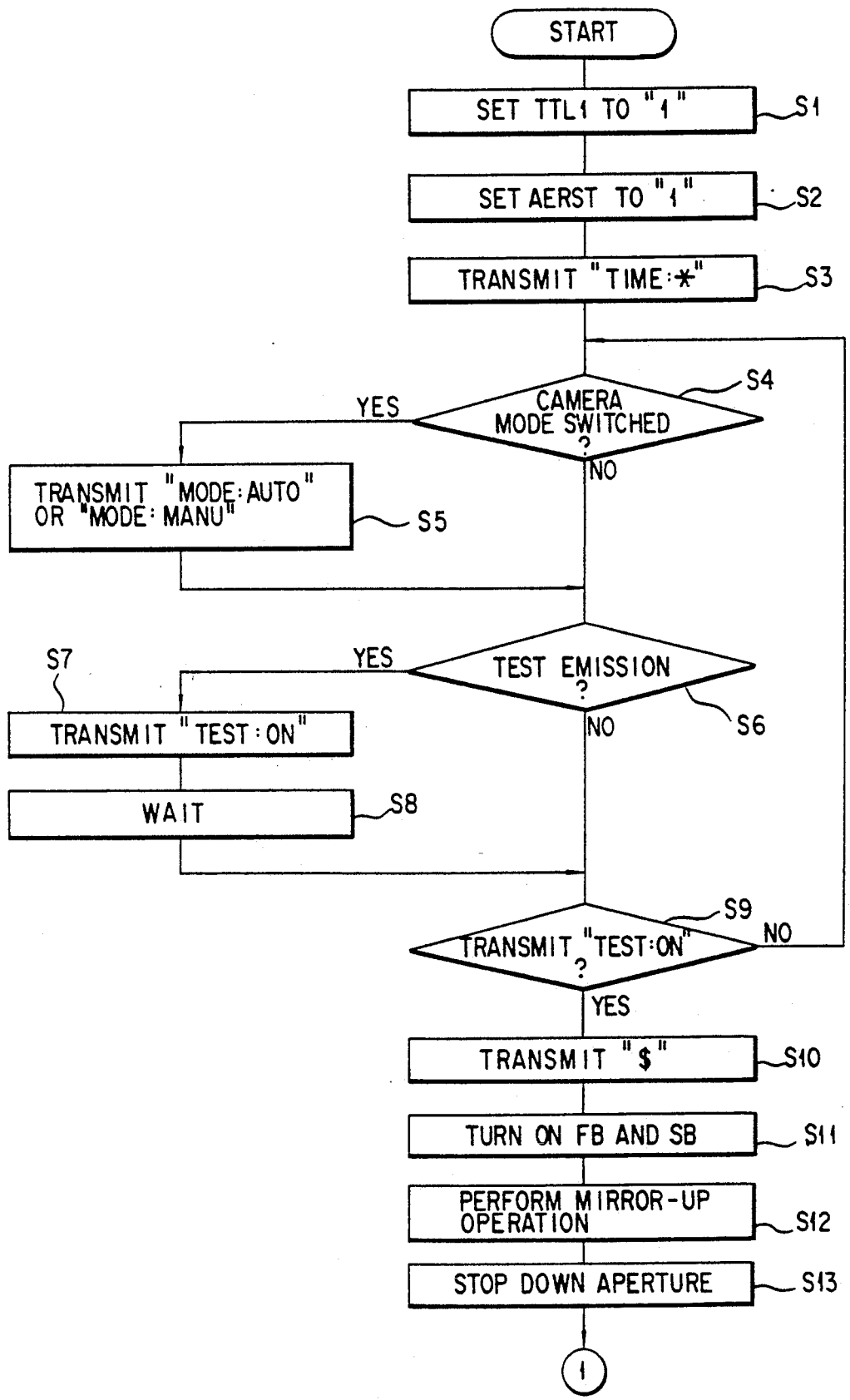
FIG. 7 is a flow chart for explaining an operation of a CCPU 9 in a camera main body 1.

Referring to FIG. 7, the CCPU 9 sets the output TTL1 to "1" in step S1. In step S2, the CCPU 9 sets the signal AERST to "1". With this setting, the photometric integral value becomes "0" (reset). In step S3, a command "TIME:* (* is a numerical value)" is transmitted. This command instructs to set the data communication restoration time Tx. For example, when the time Tx is set to be 0.2 seconds, a command "TIME:0.2" is transmitted.

In step S4, the CCPU 9 checks whether a selection switch (not shown) for setting a photographic mode of the camera main body 1, i.e., an aperture-priority automatic exposure photographic mode (in which a shutter speed is automatically set) or a manual photographic mode (in which a shutter speed and an aperture are manually set), is switched. If a switching operation is performed, the CCPU 9 causes the flow to branch to step S5 to transmit the command "MODE:AUTO" or "MODE:MANU" upon switching of the selection switch.

In step S6, the CCPU 9 checks whether test emission is performed by operating a button (not shown) on the camera main body 1. If YES in step S6, the CCPU 9 causes the flow to branch to step S7 to transmit the command ":TEST:ON", thus performing test emission. In step S8, the CCPU 9 waits for a period of time required for test emission.

In step S9, the CCPU 9 determines the next operation by monitoring the ON/OFF operation of the RELSW 2. If the RELSW 2 is OFF, the CCPU 9 causes the flow to return to step S4. If the RELSW 2 is ON, the flow advances to step S10.

In step S10, the CCPU 9 declares the execution of emission control by transmitting the declarator "$". In step S11, the CCPU 9 sets signals FB and SB to "1" so as to turn on the FBMG 11 and the SBMG 12 through the MG driver 10. In step S12, the CCPU 9 performs a mirror-up operation by operating a mirror driving motor and a driver (neither is shown). In step S13, the CCPU 9 stops down the aperture by operating an aperture driving motor and a driver (none are shown).

In step S14, the CCPU 9 sets the output TTL1 to "0". In this state, the flash device 7 can emit flashlight. In step S15, the CCPU 9 sets the signal FB to "0" to turn off the FBMG 11. With this operation, the front curtain starts to travel.

In step S16, the CCPU 9 determines the set mode of the camera main body 1. If this mode is the manual photographic mode, the flow branches to step S17. If the mode is the automatic photographic mode, the flow branches to step S18.

In step S17, the CCPU 9 waits for a period of time corresponding to the shutter speed. Meanwhile, the FSW 15 is turned on to transmit an emission start signal. Note that TTL control is not performed during this period.

If the automatic photographic mode is set, the CCPU 9 sets the signal AERST to "0" in step S18 to cause the AE circuit 13 to start photometric integration. In step S19, the CCPU 9 determines the state of the FSW 15 by monitoring the ON/OFF operation of the FSW 15. If the FSW 15 is OFF, the CCPU 9 causes the flow to branch to step S20. If the FSW 15 is ON, the CCPU 9 causes the flow to branch to step S21.

In step S20, the CCPU 9 checks whether the photometric integral value AEDT is larger than a proper exposure value AEEXP. If AEDT<AEEXP, the flow returns to step S19. In step S21, the CCPU 9 waits until AEDT≧AEEXP.

In step S22, the CCPU 9 sets the output TTL1 to "1" to instruct an emission stop. If, however, the flow goes through step S18, step S19, step S20, and step S22 in this order, the CCPU 9 instructs emission inhibition. This is because the CCPU 9 sets the output TTL1 to "1" before the FSW 15 is turned on, and hence no emission start signal is transmitted.

In step S23, the CCPU 9 sets the signal SB to "0" to turn off the SBMG 12 through the MG driver 10. With this operation, the rear curtain starts to travel. In step S24, the CCPU 9 waits until traveling of the rear curtain is completed.

Subsequently, in step S25 to step S28, the CCPU 9 sequentially performs a full-aperture operation, a mirror-down operation, a shutter charge operation, and a film wind-up operation (none are shown).

Figure 9:
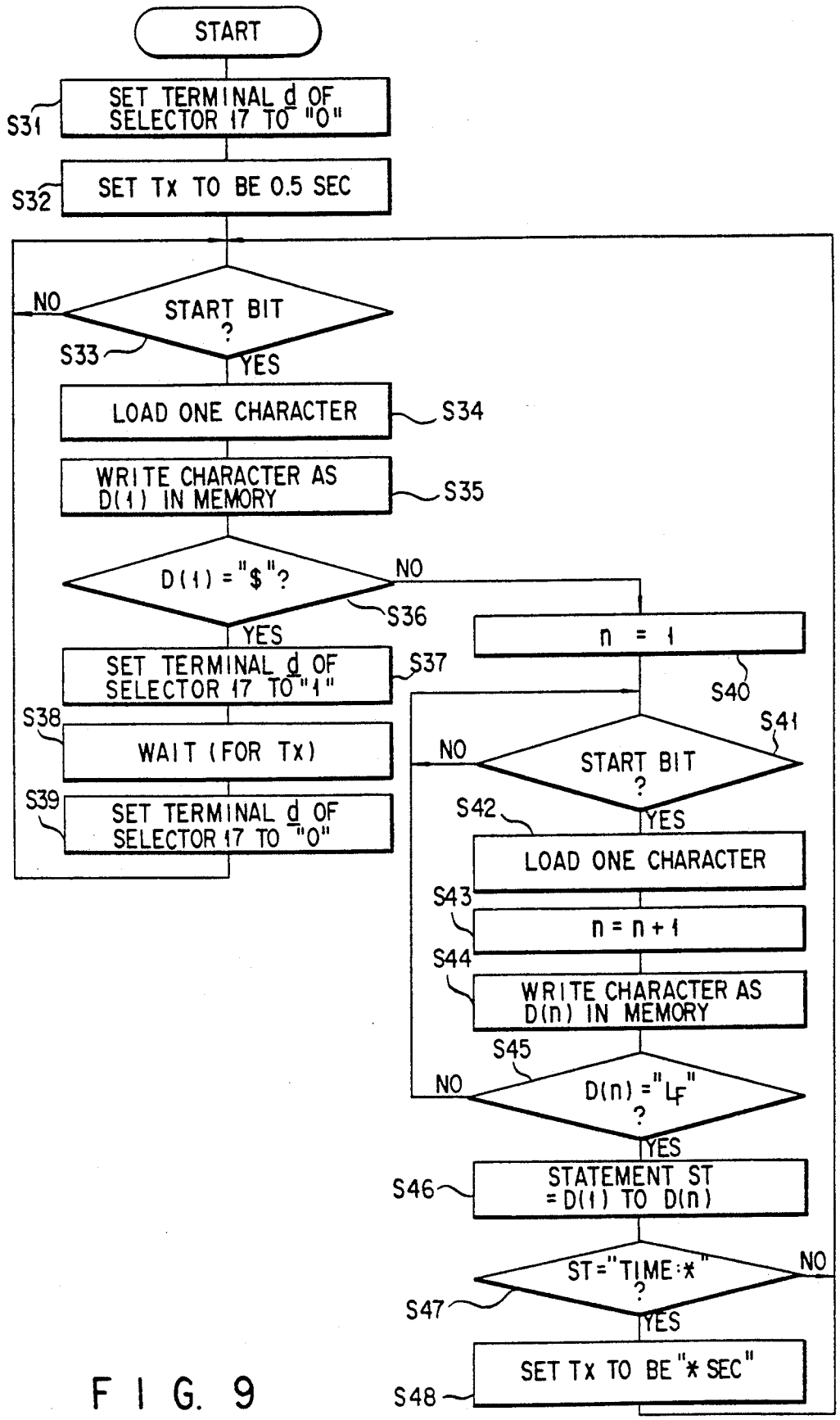
FIG. 9 is a flow chart for explaining an operation of a TCPU 18 in the transmitter 3.

An operation of the TCPU 18 in the transmitter 3 will be described below with reference to the flow chart in FIG. 9.

In step S31, the TCPU 18 sets the control terminal d of the selector 17 to "0". With this operation, the terminal b and the switch terminal c are connected to each other. In step S32, the TCPU 18 sets the data communication restoration time Tx to the default value, i.e., 0.5 sec, and waits in step S33 until it detects the start bit of data output from the terminal DT1.

The TCPU 18 loads the first character in step S34, and writes it as D(1) in the internal memory in step S35. In step S36, the TCPU 18 checks whether D(1) is "$". If YES in step S36, the flow advances to step S37 to prepare for emission control. If NO in step S36, the TCPU 18 causes the flow to branch to step S40 to load the subsequent character.

In step S36, the TCPU 18 sets the control terminal d to "1". With this operation, the terminal a and the switch terminal c are connected to each other. In step S38, the TCPU 18 waits for the restoration time Tx. In step S39, the TCPU 18 restores the control terminal d of the selector 17 to "0", thus restoring the emission control mode to the normal data communication mode.

In step S40, the TCPU 18 sets n=1. In step S41, the TCPU 18 waits until it detects a start bit. In step S42, the TCPU 18 loads the next character. In step S43, the TCPU 18 sets n=n+1. In step S44, the TCPU 18 writes the character as D(n) in the internal memory.

In step S45, the TCPU 18 checks whether D(n) is "[LF]". If NO in step S45, the flow returns to step S41 to load the next character. If YES in step S45, the flow advances to step S46.

In step S46, the TCPU 18 reads out D(1) to D(n) from the memory to obtain a statement ST. In step S47, the TCPU 18 checks whether the statement ST is "TIME:* (* is a numerical value)". If NO in step S47, the flow returns to step S33. If YES in step S47, the flow advances to step S48 to set the restoration time Tx to be "* sec". Thereafter, the flow returns to step S33.

Figure 10:
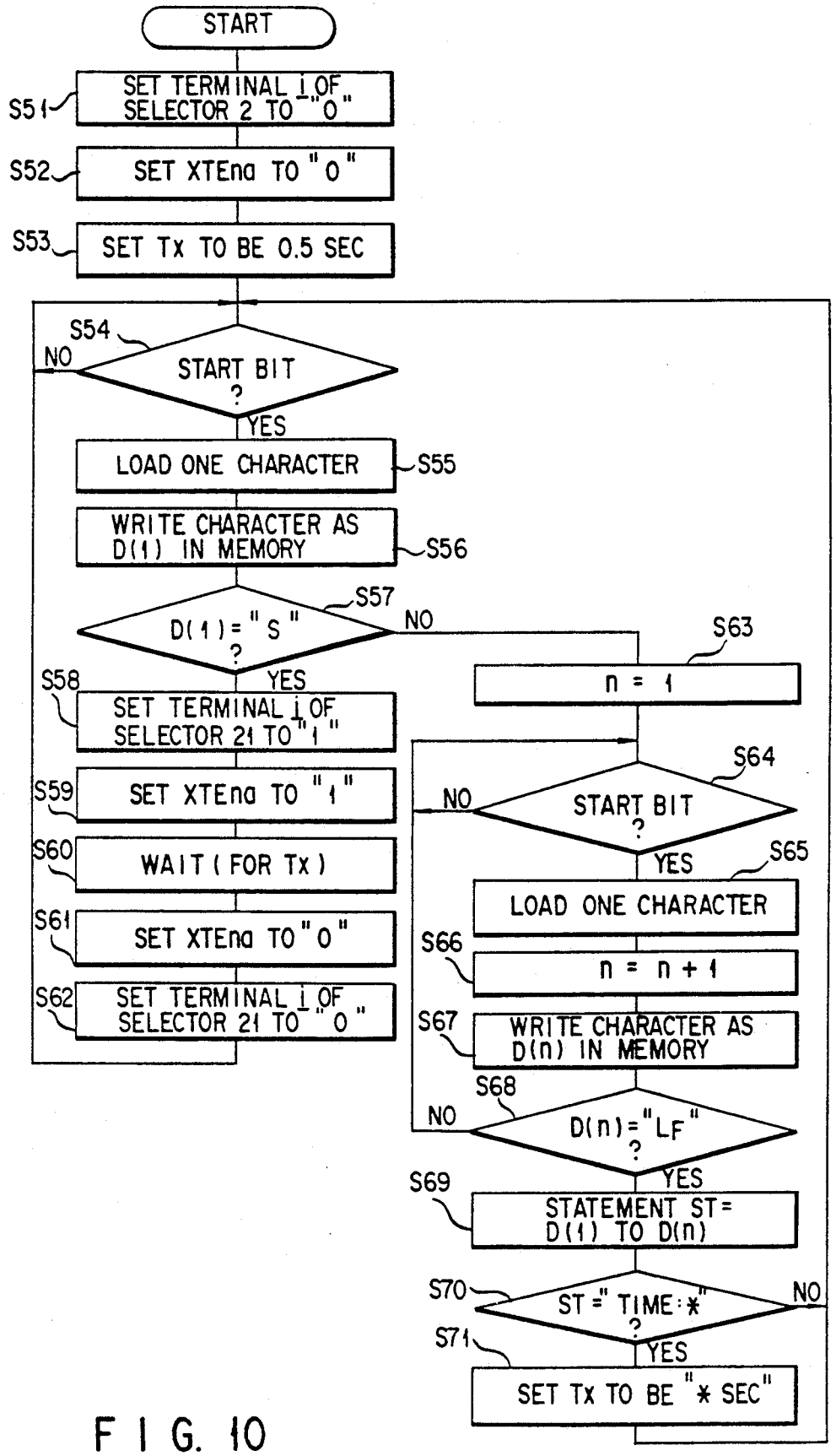
FIG. 10 is a flow chart for explaining an operation of an RCPU 20 in the receiver 5.

An operation of the RCPU 22 in the receiver 5 will be described next with reference to the flow chart in FIG. 10.

In step S51, the RCPU 22 sets the control terminal i of the selector 21 to "0". With this operation, the switch terminal f and the terminal g are connected to each other. In step S52, the RCPU 22 sets the terminal XTEna to "0" (emission inhibition state). In step S53, the RCPU 22 sets the data communication restoration time Tx to be the default value, i.e., 0.5 sec.

In step S54, the RCPU 22 waits until it detects a start bit. If a start bit is detected, the flow advances to step S55 to load the first character. In step S56, the RCPU 22 writes the character as D(1) in the memory. In step S57, the RCPU 22 checks whether D(1) is "$". If YES in step S57, the flow advances to step S58 to prepare for emission control. If NO in step S57, the RCPU 22 causes the flow to branch to step S61 (to be described later), and loads the subsequent character.

In step S58, the RCPU 22 sets the control terminal i to "1". With this operation, the switch terminal f and the terminal h are connected to each other. In step S59, the RCPU 22 sets the terminal XTEna to "1" (emission enable state). In step S60, the RCPU 22 waits for the restoration time Tx. In step S61, the RCPU 22 sets the terminal XTEna to "0". Thereafter, in step S62, the RCPU 22 restores the control terminal i of the selector 21 to "0", thus restoring the emission control mode to the normal data communication mode.

If NO in step S57, the RCPU 22 causes the flow to branch to step S63 to set n=1. In step S64, the RCPU 22 waits until it detects a start bit. Thereafter, in step S65, the RCPU 22 loads the next character.

In step S66, the RCPU 22 sets n=n+1. In step S67, the RCPU 22 writes the character as D(n) in the internal memory. In step S68, the RCPU 22 checks whether D(n) is "[LF]". If NO in step S68, the flow returns to step S64 to load the next character. If YES in step S68, the flow advances to step S69.

In step S69, the RCPU 22 reads out D(1) to D(n) from the internal memory to obtain a statement ST. In step S70, the RCPU 22 checks whether the statement ST is "TIME:* (* is a numerical value)". If NO in step S70, the flow returns to step S54. If YES in step S70, the flow advances to step S71 to set the restoration time Tx to be "* sec". Thereafter, the flow returns to step S54.

Figure 11:
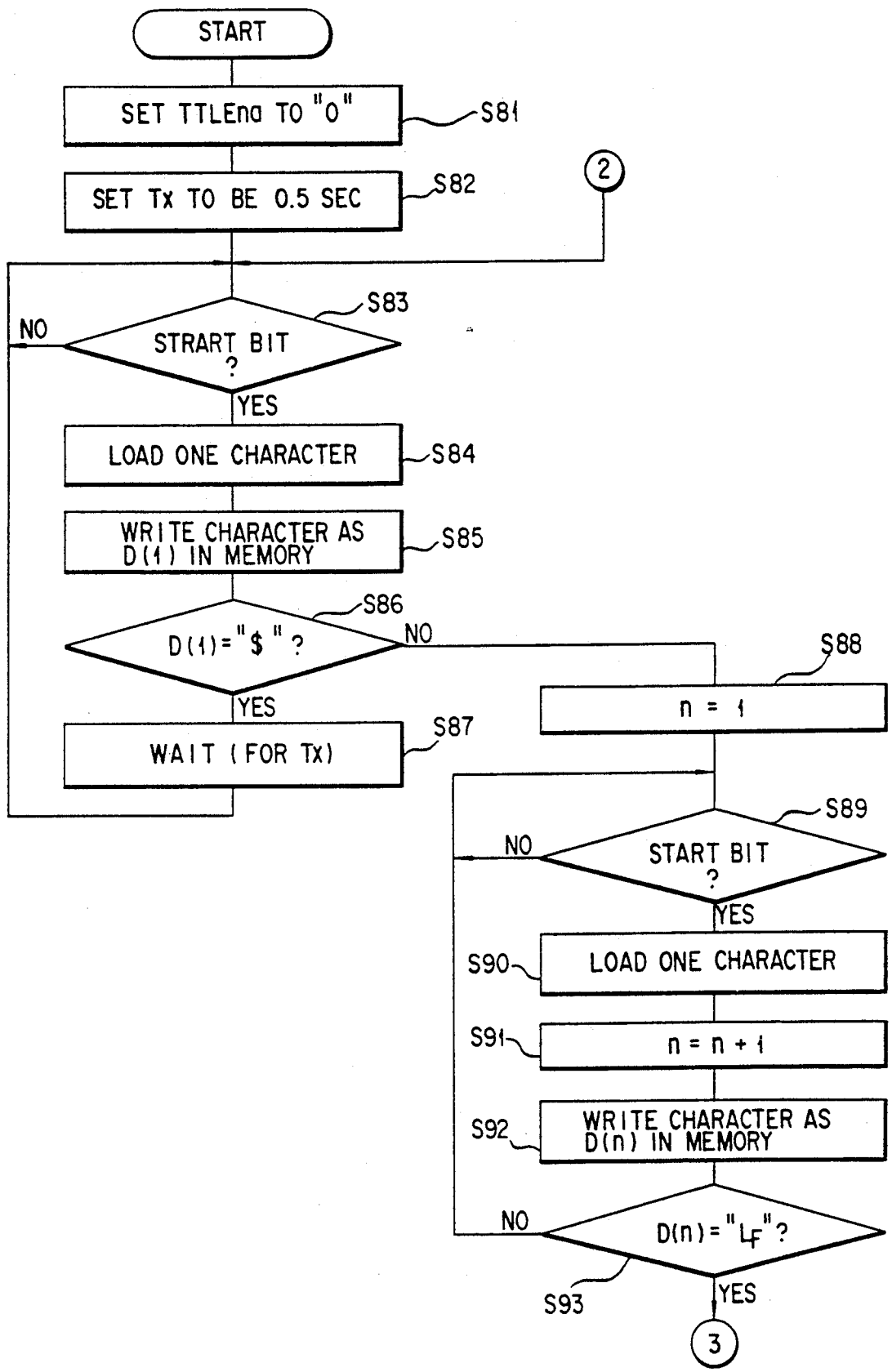
FIG. 11 is a flow chart for explaining an operation of an FCPU 24 in a flash device 7.
Figure 12:
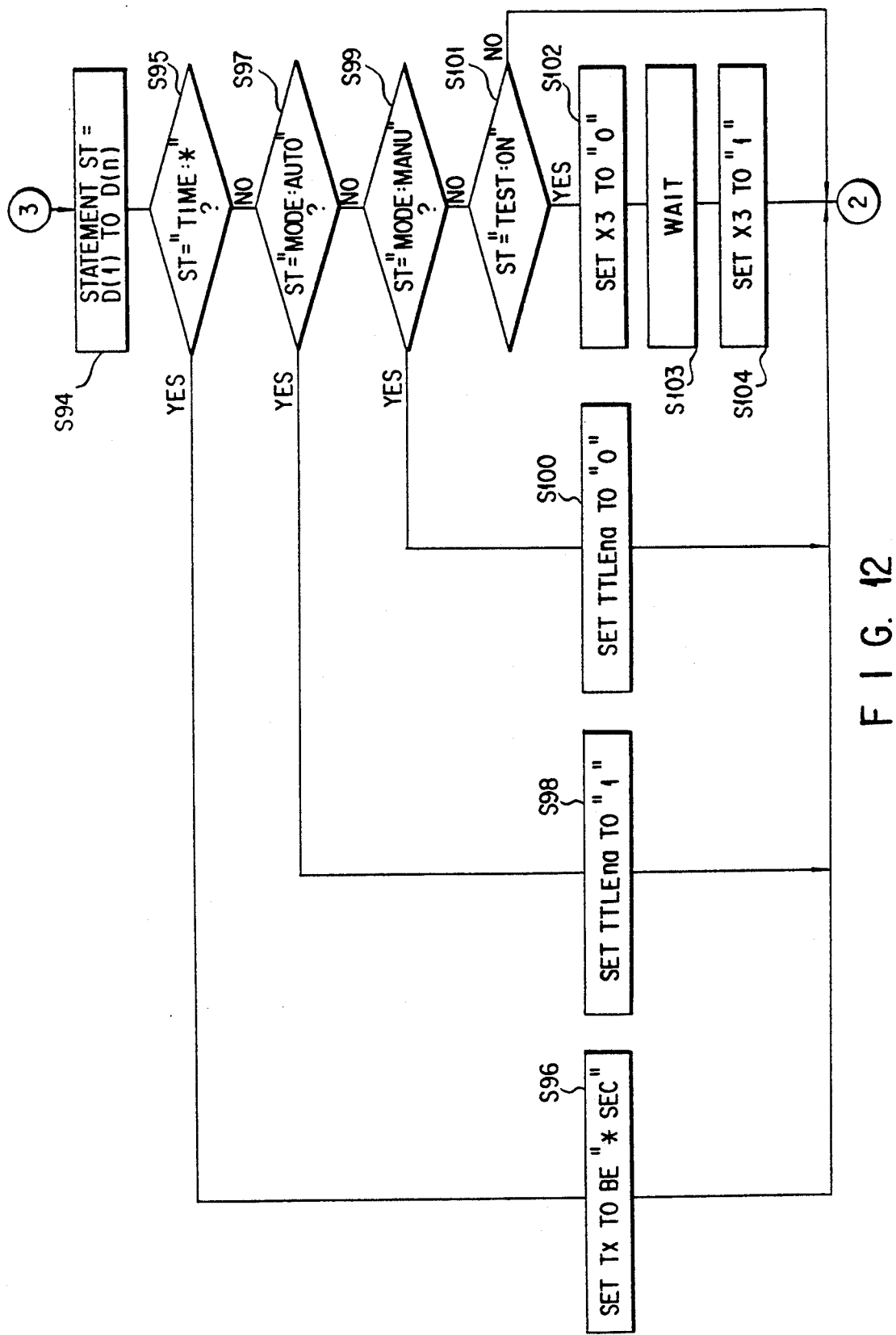
FIG. 12 is a flow chart for explaining an operation of the FCPU 24 in the flash device 7.

FIGS. 11 and 12 are flow charts for explaining an operation of the FCPU 24 in the flash device 7.

Referring to FIG. 11, the FCPU 24 sets the line TTLEna to "0" (TTL control inhibition state). In step S82, the FCPU 24 sets the data communication restoration time Tx to be the default value, i.e., 0.5 sec. In step S83, the FCPU 24 waits until it detects a start bit.

If a start bit is detected in step S83, the flow advances to step S84 to load the first character. In step S85, the FCPU 24 writes the character as D(1) in the internal memory. In step S86, the FCPU 24 checks whether D(1) is "$". If YES in step S86, the flow advances to step S87 to wait for the restoration time Tx. Thereafter, the flow returns to step S83. If NO in step S86, the FCPU 24 causes the flow to branch to step S88.

In step S88, the FCPU 24 sets n=1. In step S89, the FCPU 24 waits until it detects a start bit. The FCPU 24 loads the next character in step S90, and adds 1 to the value n in step S91. In step S92, the FCPU 24 writes the character as D(n) in the internal memory.

In step S93, the FCPU 24 checks whether D(n) is "[LF]". If NO in step S93, the flow returns to step S89 to load the next character. If YES in step S93, the flow advances to step S94 in FIG. 12.

In step S94 in FIG. 12, the FCPU 24 reads out D(1) to D(n) to obtain a statement ST. In step S95, the FCPU 24 checks whether the statement ST is "TIME:*". If YES in step S95, the FCPU 24 causes the flow to branch to step S96, and sets the restoration time Tx to be "* sec". Thereafter, the flow returns to step S83.

If NO in step S95, the flow advances to step S97 to check whether the statement ST is "MODE:AUTO". If YES in step S97, the FCPU 24 causes the flow to branch to step S98 to set the line TTLEna to "1" (to allow TTL control). The flow then returns to step S83.

If NO in step S97, the FCPU 24 checks in step S99 whether the statement ST is "MODE:MANU". If YES in step S99, the FCPU 24 causes the flow to branch to step S100 to set the line TTLEna to "0" (to inhibit TTL control). The flow then returns to step S83 in FIG. 11.

If NO in step S99, the FCPU 24 checks in step S101 whether the statement ST is "TEST:ON". If YES in step S101, the flow advances to step S102. Otherwise, the flow returns to step S83 in FIG. 11.

In step S102, the FCPU 24 sets the line X3 to "0" (to perform test emission). After the elapse of a proper period of time in steps S103 and S104, the FCPU 24 restores the line X3 to "1". Thereafter, the flow returns to step S83 in FIG. 11.

An overall operation of the camera system will be described below.

The camera system of the first embodiment comprises the camera main body 1, the transmitter 3, the receiver 5, and the flash device 7. As shown in FIGS. 1A and 1B, the transmitter 3 is mounted on the camera main body 1, and similarly, the flash device 7 is clipped on the receiver 5.

The power switches (not shown) of the respective devices are turned on first. In this case, the transmitter 3, the receiver 5, and the flash device 7 operate in accordance with the flow charts shown in FIGS. 9 to 12.

When the camera main body 1 set in a standby state after it is set in a state wherein photography can be performed, the camera main body 1 operates in accordance with the flow charts shown in FIGS. 7 and 8.

The camera main body 1 performs data communication with the flash device 7 as needed. In the embodiment, as commands to be supplied in data communication, a command for setting the data communication restoration time Tx, a command for switching the photographic modes, and a command for test emission are exemplified. These commands are transmitted finally, as commands having the same data format, to the flash device 7 through the transmitter and the receiver. Although the transmitter 3 and the receiver 5 normally ignore these commands, they write the data communication restoration time Tx in the internal memories of the respective CPUs, similar to the flash device 7.

When the RELSW 2 is depressed, the camera main body 1 starts a photographic sequence, and outputs the declarator "$" to transmit it in the data communication mode, thus declaring that the signal path for data communication, i.e., the radio path, is used as the signal path for flash emission control. Upon reception of this declarator, the transmitter 3 and the receiver 5 immediately switch the selectors 17 and 21 to input/output paths for a signal X1 (emission start signal) and a signal TTL1 (emission stop signal).

A signal from the terminal X1 of the transmitter 3, i.e., an ON signal from the FSW 15, as a falling signal, and a signal from the terminal TTL1 as a rising signal are synthesized into one signal to be transmitted to the receiver 5. The receiver 5 separates the received synthetic signal into two signals and outputs them, as an emission start signal and an emission stop signal, to the terminals X2 and TTL2 of the flash device 7, respectively.

Since the photographic sequence of the camera main body 1 has been described with reference to FIGS. 7 and 8, a description of the subsequent operations will be omitted.

In the embodiment, test emission is performed by operating an operation button (not shown) arranged on the camera main body 1. However, the present invention is not limited to this. For example, a command signal for test emission may be supplied by operating a keyboard (not shown) which can be connected to the camera main body 1, or a switch (not shown). If, for example, the keyboard is to be used, a command signal can be supplied by turning on a key corresponding to "TEST:ON".

Furthermore, in the above-described embodiment, only four commands are exemplified in data communication. In practice, however, a large number of commands can be prepared to control the flash device 7 from the camera main body 1 side. The following are examples (in this case, a detailed arrangement of each command will be omitted, assuming that each arrangement conforms to that described in the embodiment):

(1) emission mode commands (MODE:) . . . TTL control (AUTO), manual control (MANU), full emission (FULL); (2) manual emission setting command (MANU:) . . . emission amount (*); (3) radiation angle setting command (ANG:) . . . angle (*); (4) panhead operation commands (STG:) . . . upward movement (UP), downward movement (DN), rightward movement (RT), leftward movement (LT), stop (ST); (5) communication mode change commands . . . data communication restoration time setting (TIME:*), baud rate change command (BAU:*); (6) display commands (DISP) . . . character (*), clear (CLR); (7) AF LED command (AFIL:) . . . turn-on (ON), turn-off (OFF); and (8) initialization command . . . (RST).

These commands (1) to (8) will be described next.

The emission mode commands (1) include three commands, i.e., "AUTO" (TLL control), "MANU" (emission of flashlight corresponding to a manually set amount), and "FULL" (full emission). If the manual setting function is not set, the command "MANU" is equivalent to the command "FULL".

The manual emission setting command (2) ("MODE:-MANU") is used to set an emission amount. Note that "*" of "MANU:*" represents a numerical value.

The radiation angle setting command (3) is used to change the radiation angle by moving the Xe tube and the reflector forward and backward. In this case, a command "ANG:* (* is a numerical value)" is used.

The panhead operation command is used to change the direction of the flash device 7 by installing the panhead. A command "STG:UP" designates upward movement; a command "STG:DN", downward movement; a command "STG:RT", rightward movement; a command "STG:LT", leftward movement; and a command "STG:ST", a stop.

The communication mode change commands (5) include a data communication restoration time setting command and a baud rate change command.

If a liquid crystal display is arranged on the rear surface of the flash device 7, the display commands (6) are used to perform display from the camera main body 1 side.

If an AF auxiliary light is arranged in the flash device 7, the AF LED commands (7) are used to turn on/off the light.

As the initialization command (8), "RST" is transmitted to restore each mode of the flash device 7 to the initial state.

Another embodiment of the present invention will be described next.

According to the system of the first embodiment described above, since no cord is required between the camera main body and the flash device, no limitation is imposed on the distance between the camera main body and the flash device within the radio range, and damage to the respective devices due to the presence of a cord need not be worried.

Especially when an electromagnetic wave is used as a radio means, communication between the camera main body and the flash device can be performed even if some obstacle is present therebetween. In addition, since the distance between the camera main body and the flash device can be increased, such a system is useful for the user.

Depending on radio means, however, time delays may be caused in the transmission of signals. If, for example, data communication radio stations are used, the currently used band must be limited to prevent an electromagnetic wave in a selected channel from entering an adjacent channel and causing radio interference. For this reason, the transmission rate cannot be increased to exceed a predetermined value. That is, the line itself involves a time delay (e.g., about 400 to 500 μsec).

When emission control is to be performed by radio, therefore, an emission start signal output from the camera main body side is actually received by the flash device after the time delay. The time delay is 0.5 msec in a carrier frequency 400 MHz and a modulation frequency ±1.0 kHz, for example. If the maximum shutter speed at which synchronous flash photography can be performed in wire communication is 1/250 sec, the maximum shutter speed at which synchronous flash photography can be performed in radio communication is given by the following formula:

$$1/250 + 0.5 \times 10^{-3} \doteq 1/220$$

That is, the shutter speed in radio communication is decreased.

In addition, since the reception of an emission stop signal is also delayed, so-called overexposure is set as a photographic condition of the camera main body. Since emission of flashlight is completed within several msec, almost full emission is often caused.

The following embodiment, therefore, is designed to eliminate inconvenience caused by a time delay of a line in emission control by radio.

Assume that a delay of a radio channel is represented by $t_d$.

For example, emission prediction is performed according to the following steps:

i) The camera main body recognizes through a detection means that the flash device is controlled by radio. ii) The camera main body includes a first emission start signal generating means for outputting a signal when traveling of a shutter curtain is completed, and a second emission start signal generating means for generating a signal at a timing earlier than the output timing of the first emission start generating means by the time $t_d$. When emission control by radio is recognized in the first step i), the signal from the second emission start signal generating means is output to the flash device. iii) The flash device receives the emission start signal after the elapse of the time $t_d$, and hence starts to emit flashlight at the same timing as that in emission control by wire connection.

Another example of emission predication is performed as follows:

i) The camera main body recognizes through the detection means that the flash device is controlled by radio, and detects that the TTL metering mode is selected. ii) The camera main body sets the flash device in an emission mode in which the emission amount per unit time is constant, i.e., a flat emission mode. iii) The camera main body outputs an emission start signal to the flash device. iv) The camera main body calculates a light amount integral value by direct photometry. v) The emission control means of the camera main body monitors the light amount integral value. In this case, sine the flash device is set in the flat emission mode, this integral value almost linearly increases. Therefore, an emission stop timing $t_e$ can be predicted from the gradient of the integral curve. vi) The camera main body outputs an emission stop signal at a timing earlier than the predicted timing $t_e$ by the time $t_d$, i.e., a timing given by $t_e - t_d$. vii) The flash device receives the emission stop signal after the elapse of the time $t_d$, i.e., the timing $t_e$, and stops the emission of flashlight.

FIGS. 13A and 13B are block diagrams schematically showing the camera main body, flash device, and peripheral devices of a camera system according to another embodiment of the present invention. FIG. 13A shows a camera main body 1' and a transmitter 3'. FIG. 13B shows a receiver 5 and a flash device 7'. The same reference numerals in this embodiment denote the same parts as in the first embodiment, and a description thereof will be omitted.

Referring to FIG. 13A, the camera main body 1' incorporates a camera (CCPU) 9 serving as a portion for controlling an operation of the camera and performing communication with other accessories. The CCPU 9 monitors a value AEDT, obtained by A/D-converting an output value from an AE circuit 13 through an A/D converter 42, and signals from an RELSW 2 and a mode setting section 43. In addition, the CCPU 9 has a function of detecting the connection of the radio transmitter, i.e., the transmitter 3', and controls shutter curtain lock magnets FBMG 11 and SBMG 12 through an MG driver 10. Furthermore, the CCPU 9 outputs a second emission start signal Xb or an emission stop signal TTL1 to an AND/OR gate 44, and has a switch signal line for causing the AND/OR gate 44 to output either a first emission start signal Xa from an FSW 15 or the second emission start signal Xb by using a selector signal X.sel.

The mode setting section 43 is a setting means for controlling the modes of the camera main body 1' and the accessories. Especially in this case, the mode setting section 43 can set the TTL metering mode.

The FSW 15 is a means for generating the first emission start signal Xa. The FSW 15 is turned on in synchronism with the timing at which traveling of the front curtain is completed. The signal Xa is selected when a terminal X.sel of the AND/OR gate 44 is set at L level.

Note that a terminal WLD is used to detect the connection of a wireless flash device.

In the transmitter 3', a TCPU 18 controls a terminal d of a selector 17. When the power switch (not shown) of the transmitter 3' is turned on, the TCPU 18 turns on a transistor Q1 to inform the CCPU 9 through the terminal WLD that the accessory connected to the camera main body 1' is the transmitter 3' of the wireless flash device.

In the flash device 7' shown in FIG. 13B, an FCPU 24 serves to receive and load serial data through a terminal DT2. In addition, the FCPU 24 controls lines X3 (emission signals such as a test emission signal), TTLEna (TTL emission control enable signal), and F.MODE (F.MD: switching between flashlight emission and flat emission).

Since the arrangements of a transmitting section 19 of the transmitter 3' and a receiving section 20 of the receiver 5, data communication between the transmitting section 19 and the receiving section 20, normal data communication, and communication for emission control in the second embodiment are the same as those in the first embodiment described with reference to FIGS. 3 to 6B, a description thereof will be omitted.

An operation of each CPU used in the second embodiment will be described next with reference to FIGS. 14 to 19.

An operation of the CCPU 9 will be described first with reference to the flow charts shown in FIGS. 14 to 16.

Figure 14:
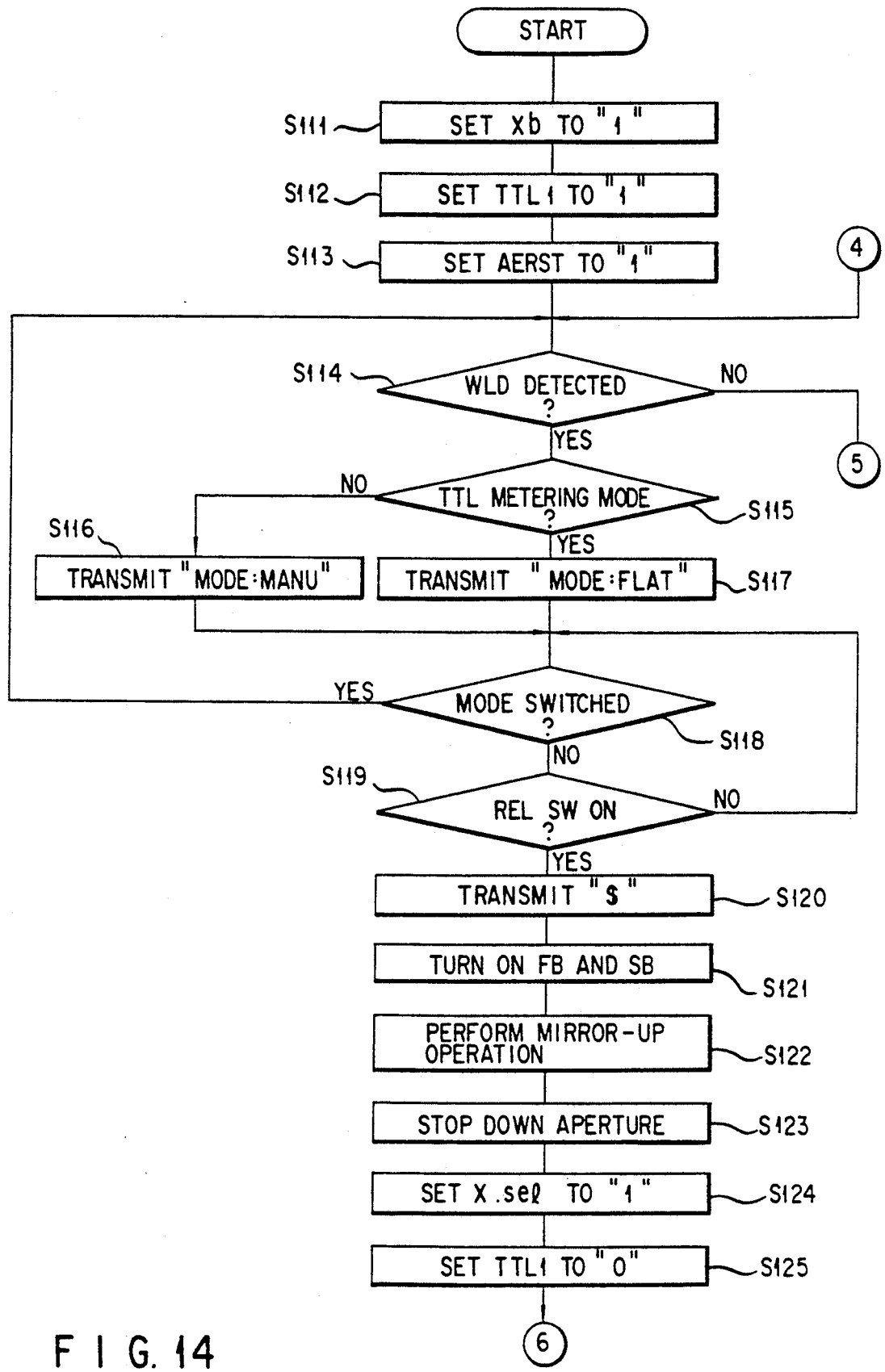
FIG. 14 is a flow chart for explaining an operation of a CCPU 9 in a camera main body 1'.

Referring to FIG. 14, in step S111, the CCPU 9 sets the signal Xb, i.e., the second emission start signal, to "1" (OFF). In step S112, the CCPU 9 sets the signal TTL1 to "1". In step S113, the CCPU 9 sets the signal AERST to "1". With this operation, the photometric integral value of the AE circuit 13 becomes 0 (reset). In step S114, the CCPU 9 detects through the terminal WLD whether the transmitter 3' of the wireless flash device is connected to the camera main body 1'. More specifically, when the terminal WLD is at "0" level, it is determined that the transmitter 3' of the wireless flash device is connected to the camera main body 1'. When the terminal WLD is at "1" level, it is determined that the transmitter 3' of the wireless flash device is not connected to the camera main body 1'.

If it is determined, upon monitoring the terminal WLD, that the wireless flash device is connected to the camera main body 1', the flow advances to step S115 to check whether the TTL metering mode is set by the camera mode setting section 43. If NO in step S115, the flow advances to step S116 to output the command "MODE:MANU" through a data line DT1. If YES in step S115, the flow advances to step S117 to output the command "MODE:FLAT" through the data line DT1.

Unless switching of the mode of the camera main body 1' or the ON state of the RELSW 2 is detected in step S118 or step S119, the CCPU 9 repeats this loop. If it is detected in step S118 that the mode is switched, the flow returns to step S114. If it is detected in step S118 that the RELSW 2 is turned on, the flow advances to step S120.

When the RELSW 2 is turned on, the CCPU 9 transmits a declarator "$" in step S120 to declare that emission control is performed. In step S121, the CCPU 9 sets signals FB and SB to "1" to turn on the front curtain magnet FBMG 11 and the rear curtain magnet SBMG 12 through the MG driver 10. In step S122, the CCPU 9 performs a mirror-up operation by operating a mirror driving motor and a driver (neither is shown). In step S132, the CCPU 9 stops down the aperture by operating an aperture driving motor and a driver (neither is shown).

In step S124, the CCPU 9 sets the selector signal X.sel to "1". With this operation, the second emission start signal is selected. Thereafter, in step S125, the CCPU 9 sets the signal TTL1 to "0". In this state, an emission signal can be output to the flash device side.

Figure 15:
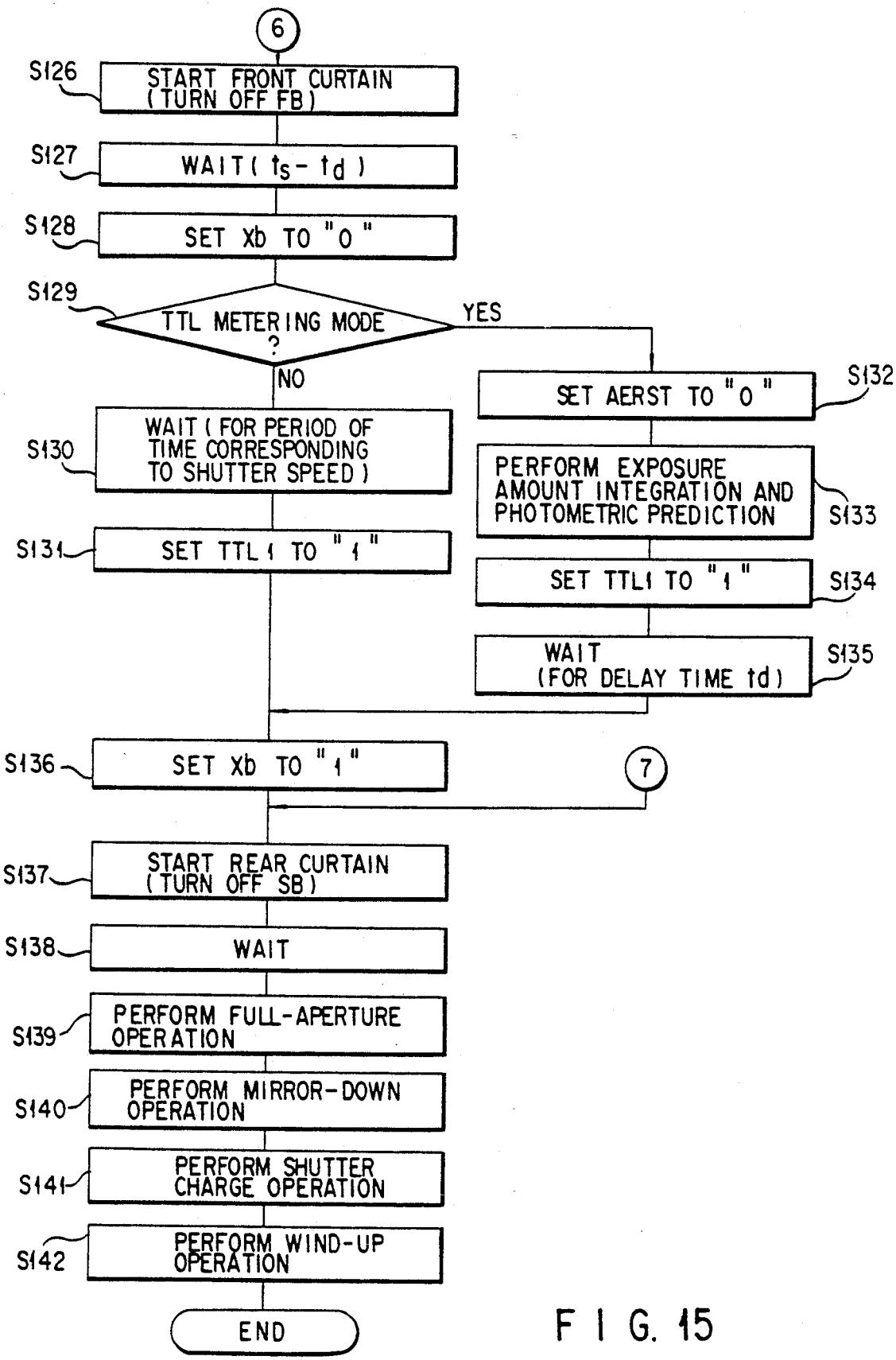
FIG. 15 is a flow chart for explaining an operation of the CCPU 9 in the camera main body 1'.

Referring to FIG. 15, in step S126, the CCPU 9 sets the signal FB to "0" to turn off the FBMG 11. As a result, the front curtain starts to travel. In step S127, the CCPU 9 waits for a predetermined period of time. This waiting time can be represented by $(t_s - t_d)$ where $t_s$ is the time interval between the instant at which the FBMG 11 is turned off and the instant at which traveling of the front curtain is completed, and $t_d$ is the signal delay time of the communication channel.

In step S128, the CCPU 9 sets the second emission start signal Xb to "0". With this operation, an emission command is output. Subsequently, the flow advances to step S129 to check whether the camera main body 1' is set in the TTL metering mode. If NO in step S129, the flow advances to step S130 to wait for a period of time corresponding to a set shutter speed. Thereafter, in step S131, the CCPU 9 sets the signal TTL1 to "1" (emission inhibition state), and the flow advances to step S136.

If YES in step S129, the flow advances to step S132 to set the signal AERST to "0" to cause the AE circuit 13 to start photometric integration. In step S133, the CCPU 9 monitors the integral value obtained by the AE circuit 13, and obtains an emission stop timing $t_e$ by a predetermined calculation. In step S134, the CCPU 9 sets the signal TTL1 to "1" at the timing ($t_e - t_d$), i.e., outputs an emission stop signal. In step S135, the CCPU 9 waits for the time $t_d$. Note that the calculation method used in step S133 will be described later.

After restoring the signal Xb to "1" in step S136, the CCPU 9 turns off the signal SB to cause the rear curtain to travel in step S137. In step S138, the CCPU 9 waits until traveling of the rear curtain is completed. Subsequently, in steps S139 to S142, the CCPU 9 sequentially performs a full-aperture operation, a mirror-down operation, a shutter charge operation, and a film wind-up operation (none are shown).

If the CCPU 9 determines in step S114 in FIG. 14 that the wireless flash device is not connected, the flow advances to step S143 in FIG. 16 to check whether the TTL metering mode is set by the mode setting section 43. Since the processing operations in the subsequent steps, i.e., the operations in steps S144 to S147, and the operations in steps S148 to S153, are the same as those in steps S116 to S119, and in steps S121 to S126, a description thereof will be omitted.

In step S154, the CCPU 9 checks whether the set mode of the camera is the TTL metering mode. If NO in step S154, the flow advances to step S155 to wait for a period of time corresponding to a set shutter speed. If YES in step S154, the flow advances to step S156 to set the signal AERST to "0". In step S157, the CCPU 9 causes the AE circuit 13 to perform exposure amount integration. Thereafter, in step S158, the CCPU 9 sets the signal TTL1 to "1" (emission inhibition state), and the flow advances to step S137 described above.

Figure 17:
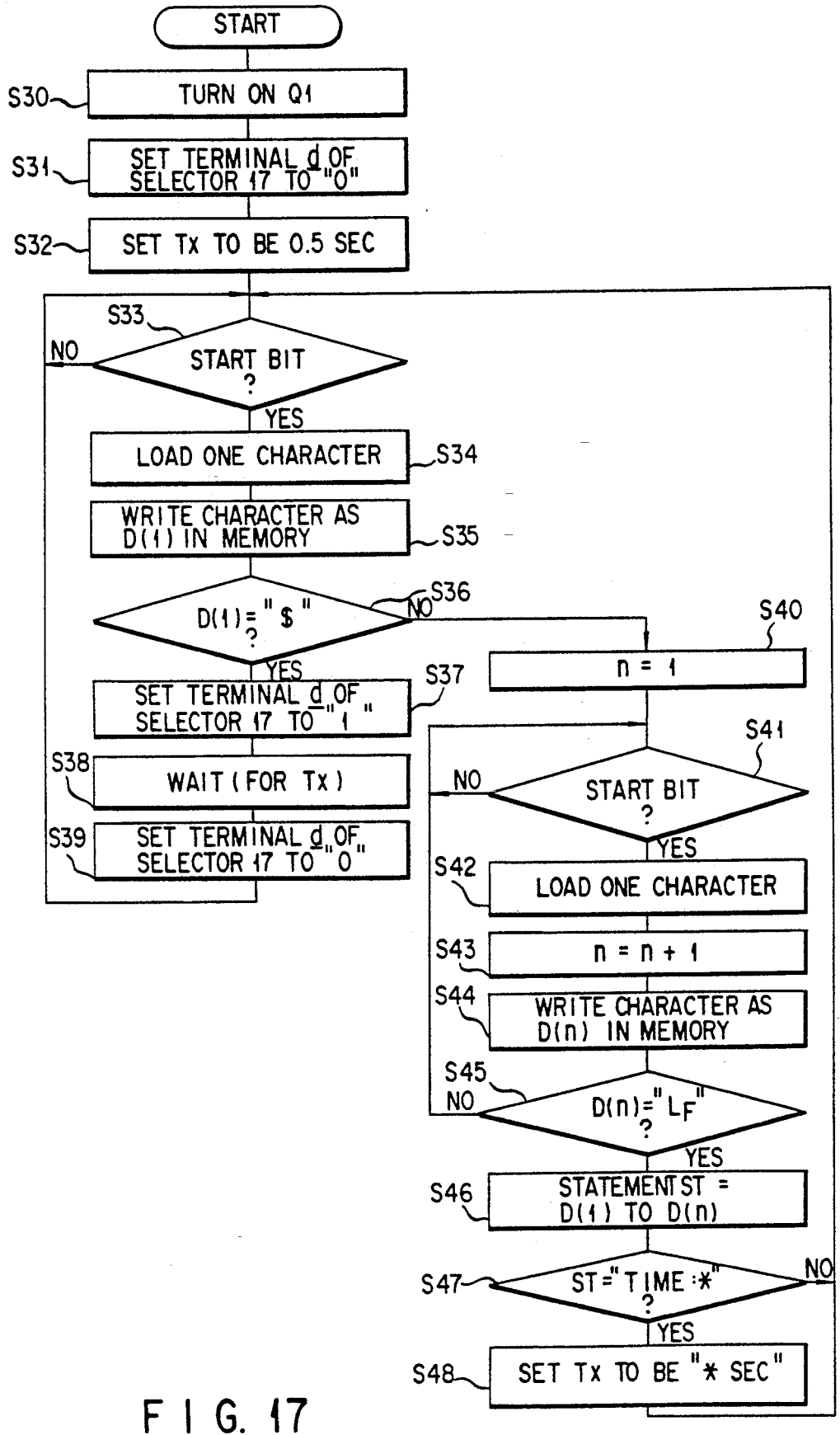
FIG. 17 is a flow chart for explaining an operation of a TCPU 18 in a transmitter 3'.

An operation of the TCPU 18 in the transmitter 3' will be described next with reference to the flow chart shown in FIG. 17.

In step S30, the TCPU 18 turns on the transistor Q1 to set the signal WLD to "0", thus informing the CCPU 9 of the camera main body 1' that the wireless flash is connected. In the second embodiment, the step of informing the connection of the wireless flash device is added to the operation of the TCPU 18 in the first embodiment described above. That is, the processing operations in the subsequent steps, i.e., steps S31 to S48, are the same as those in the flow chart shown in FIG. 9, and hence a description thereof will be omitted.

Since an operation of an RCPU 22 in the receiver 5 can be described with reference to the same flow chart as that shown in FIG. 10, the flow chart for the RCPU 22 will be omitted.

Figure 18:
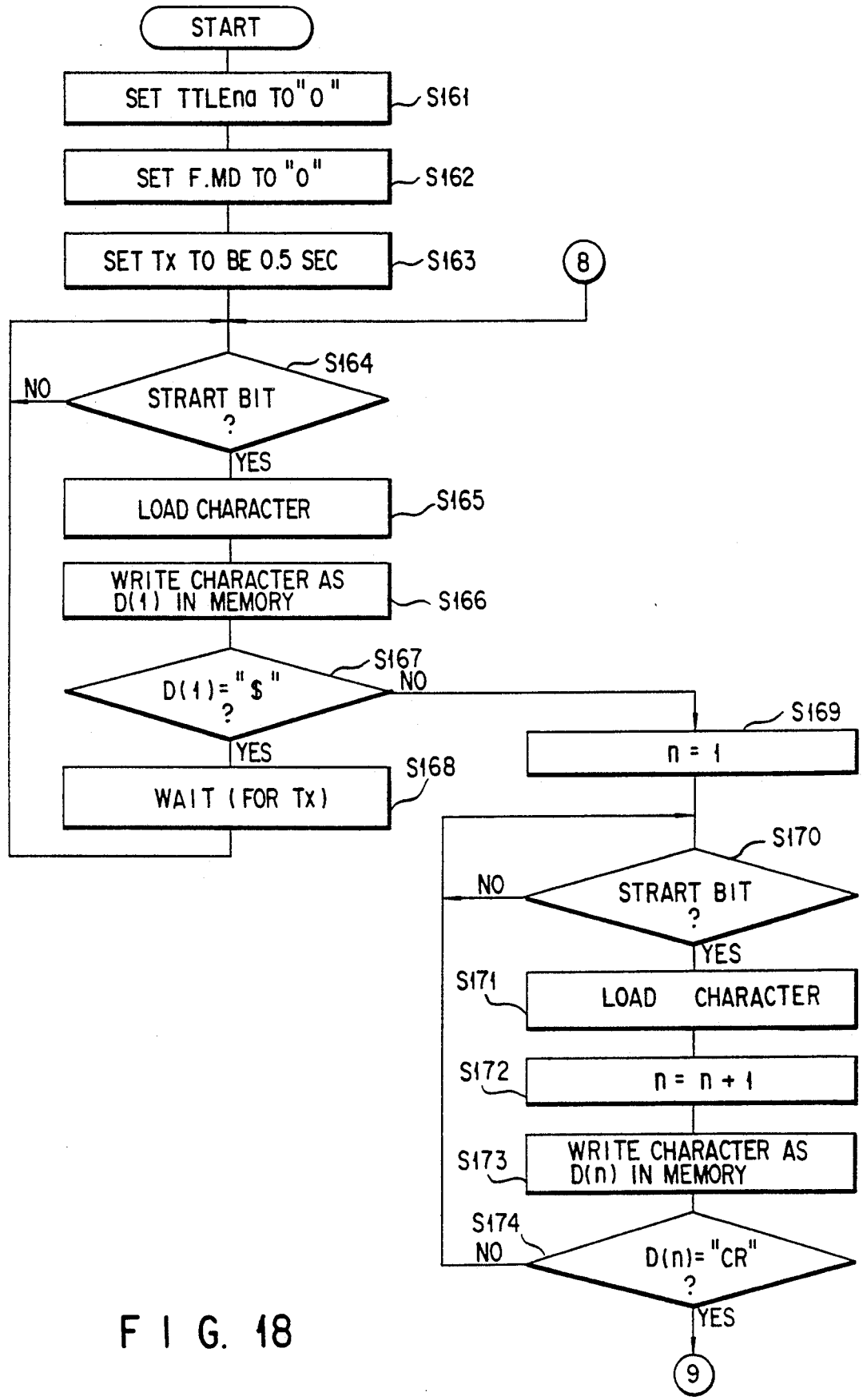
FIG. 18 is a flow chart for explaining an operation of an FCPU 24 in a flash device 7'.
Figure 19:
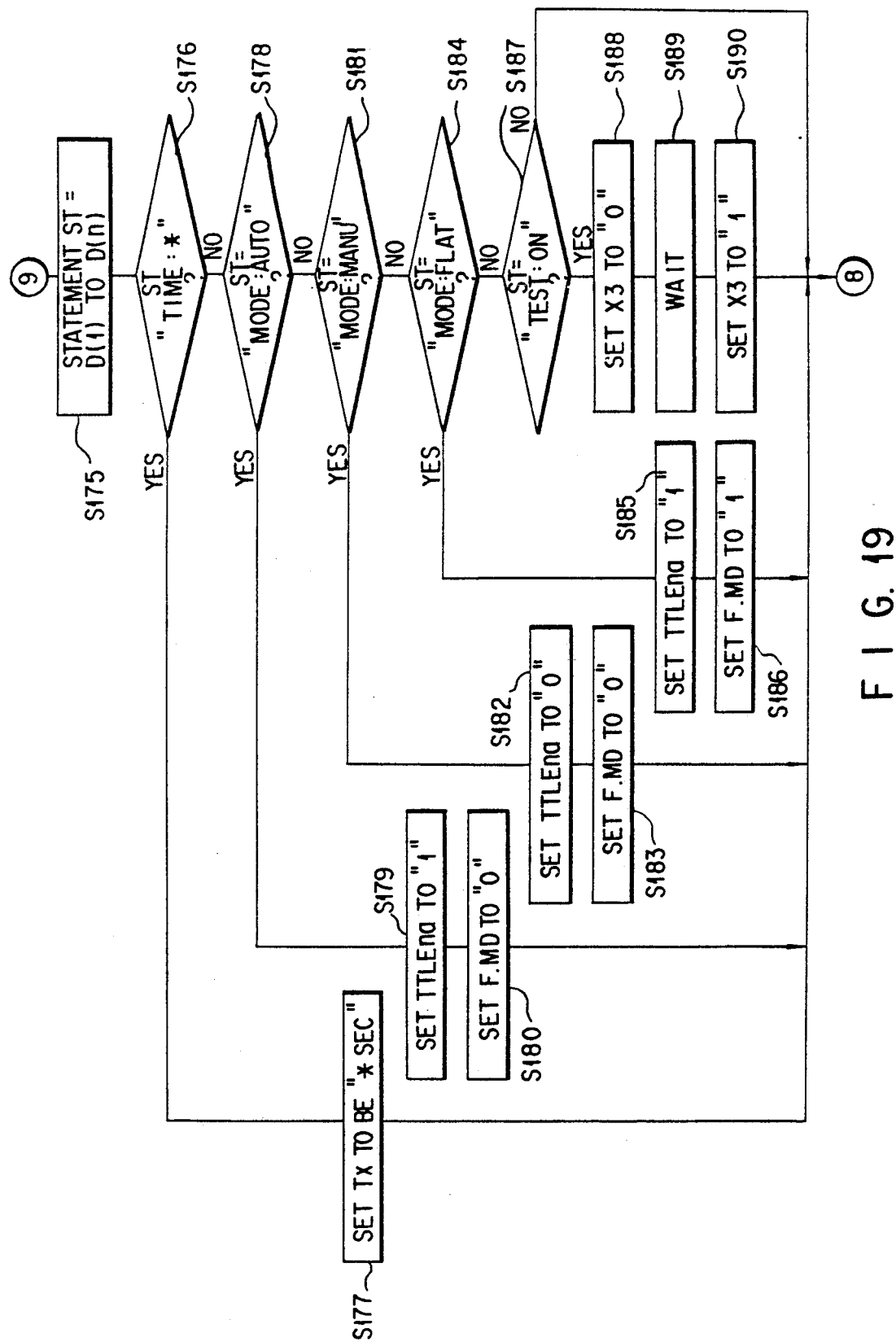
FIG. 19 is a flow chart for explaining an operation of the FCPU 24 in the flash device 7'.
Figure 21:
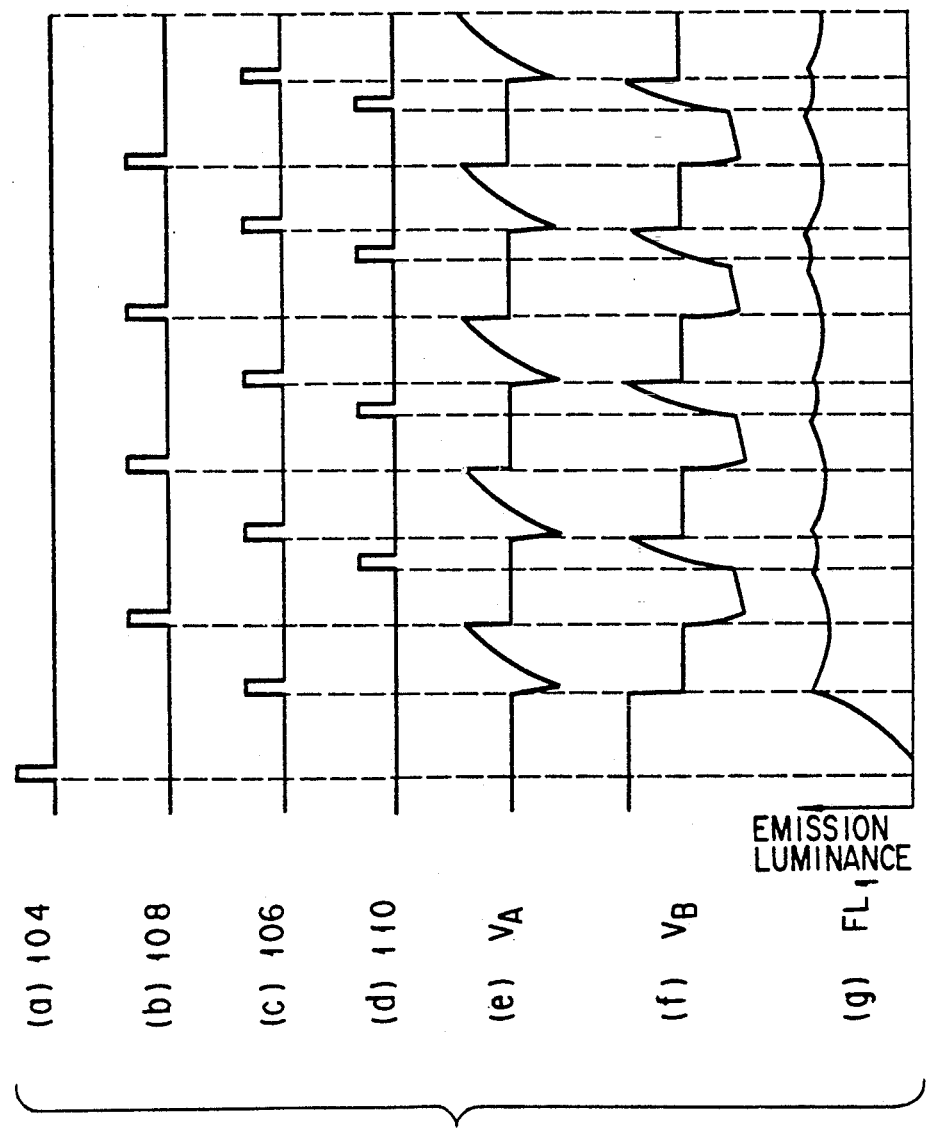
FIGS. 21(a) to 21(g) are timing charts showing the waveforms of signals output from the respective portions shown in FIG. 20.

FIGS. 18 and 19 are flow charts for explaining an operation of the FCPU 24 in the flash device 7'.

Referring to FIG. 18, in step S161, the FCPU 24 sets the line TTLEna to "0" (TTL control inhibition state). In step S162, the FCPU 24 sets the line F.MD to "0" to set the flashlight emission mode. In step S163, the FCPU 24 sets a data communication restoration time $T_x$ to be 0.5 sec as a default value. In step S164, the FCPU 24 waits until it detects a start bit.

If a start bit is detected in step S164, the flow advances to step S165 to load the first character. In step S166, the FCPU 24 writes the character as D(1) in the internal memory. In step S167, the FCPU 24 checks whether D(1) is "$". If YES in step S167, the flow advances to step S168 to wait for the restoration time $T_x$. The flow then returns to step S164.

If NO in step S167, the flow advances to step S169 to set n=1. In step S170, the FCPU 24 waits until it detects a start bit. In step S171, the FCPU 24 loads the next character. In step S172, the FCPU 24 sets n=n+1. In step S173, the FCPU 24 writes the character as D(n) in the internal memory.

In step S174, the FCPU 24 checks whether D(n) is [CR] (carriage return). If NO in step S174, the flow returns to step S170 to load the next character. If YES in step S174, the flow advances to step S175 in FIG. 19.

In step S175 in FIG. 19, the FCPU 24 reads out D(1) to D(n) from the internal memory to obtain a statement ST. If the FCPU 24 determines in step S176 that the statement ST is "TIME:*", the FCPU 24 causes the flow to branch to step S177 to set the restoration time Tx to "* sec". Thereafter, the flow returns to step S164 in FIG. 18.

If NO in step S176, the flow advances to step S178 to check whether the statement ST is "MODE:AUTO". If YES in step S178, the FCPU 24 causes the flow to branch to step S179 to set the line TTLEna to "1" (to allow TTL control). After the FCPU 24 sets the line F.MD to "0", i.e., the flashlight emission mode, in step S180, the flow returns to step S164 in FIG. 18.

If NO in step S178, the FCPU 24 checks in step S181 whether the statement ST is "MODE:MANU". If YES in step S181, the FCPU 24 causes the flow to branch to step S182 to set the line TTLEna to "0" (to inhibit TTL control). After the FCPU 24 sets the line F.MD to "0" in step S183, i.e., the flashlight emission mode, the flow returns to step S164 in FIG. 18.

If NO in step S181, the flow advances to step S184 to check whether the statement ST is "MODE:FLAT". If YES in step S184, the FCPU 24 causes the flow to branch to step S185 to set the line TTLEna to "1" (to allow TTL control). After the FCPU 24 sets the line F.MD to "1", i.e., the flat emission mode, in step S186, the flow returns to step S164 in FIG. 18.

If NO in step S184, the FCPU 24 checks in step S187 whether the statement ST is "TEST:ON". If YES in step S187, the flow advances to step S188. Otherwise, the flow returns to step S164.

In step S188, the FCPU 24 sets the line X3 to "0" to perform test emission. Subsequently, in steps S189 and S190, the FCPU 24 restores the line X3 to "1" after the elapse of a predetermined period of time. The flow then returns to step S164 in FIG. 18.

FIG. 20 shows a circuit arrangement of the flash device 7'.

This circuit is obtained by partially modifying the first embodiment of the invention disclosed in Published Unexamined Japanese Patent Application No. 59-222821 filed by the assignee of the present invention. More specifically, as shown in FIG. 20, a battery BT is connected to a booster circuit 101 through a power switch PSW. In addition, an AND circuit AD3 receives a signal F.MD as well as outputs from an oscillation circuit 102 and a flip-flop (FF) circuit 103. This signal F.MD is also input to an AND circuit AD2.

An output from an AND circuit AD1, which receives signals TTLEna and TTL2, is input to one input terminal of the AND circuit AD2. In addition, the output from the AND circuit AD1 is also supplied to an OR circuit OR3 through a NOT circuit NT3.

Signals X2 and X3 are input to a NAND circuit ND1. An output from the NAND circuit ND1 is supplied to the FF circuit 103.

The booster circuit 101, the oscillation circuit 102, the FF circuit 103, FF circuits 107, 109, and 113, pulse generators 104 and 114, a frequency divider 105, counters 106, 108, and 110, and an arithmetic circuit 111 in FIG. 20 respectively correspond to a power supply circuit 1, an oscillation circuit 2, FF circuits 3, 7, and 9, pulse generators 4 and 14, a frequency divider 5, counters 6, 8, and 10, and an arithmetic circuit 11 in FIG. 1 in Published Unexamined Japanese Patent Application No. 59-222821. Other circuit arrangements shown in FIG. 20 are the same as those in FIG. 1 in Published Unexamined Japanese Patent Application No. 59-222821. Therefore, a description of these circuit arrangements will be omitted.

In the flash device having such an arrangement, the flashlight emission mode and the flat emission mode are switched by a signal input from the terminal F.MD. When emission of light is caused upon reception of the signals X2 and X3, and the signal TTL2 is set to "0" while the signal TTLENa is "1", the emission is stopped. Since other operations are described in detail in Published Unexamined Japanese Patent Application No. 59-222821, a description thereof will be omitted.

FIGS. 21(a) to 21(g) are timing charts showing the waveforms of output signals from the respective portions in FIG. 20.

The first photometric prediction method in this camera system will be described below with reference to FIG. 22.

Assume that an integral potential for proper exposure is represented by $V_e$. In this case, if potentials $V_1$ and $V_2$ lower than the potential $V_e$ are set, and the timings at which the integral potential reaches the potentials $V_1$ and $V_2$ are respectively represented by $t_1$ and $t_2$, a timing $t_e$ at which the integral potential reaches the potential $V_e$ is calculated as follows:

$$(t_2 - t_1):(V_2 - V_1) = (t_e - t_2):(V_e - V_2)$$

Therefore, $$t_e = t_2 + ((V_e - V_2)/(V_2 - V_1))\cdot(t_2 - t_1) \quad (1)$$

Equation (1) can be calculated regardless of the potentials $V_1$ and $V_2$. However, for the sake of a simple calculation, assume in this case that $V_1 = (\frac{1}{3})V_e$. Then, equation (1) is rewritten as follows:

$$t_e = t_2 + 2(t_2 - t_1) = 3t_2 - 2t_1 \quad (1)$$

If, the channel delay is represented by $t_d$, the timing at which an emission stop signal is output from the camera main body side is given by $$t_e - t_d = 3t_2 - 2t_1 - t_d \quad (1)$$

Note that it is assume that this integral potential is linear. With actual flat emission, an almost linear relationship can be established between the integral potential and time. However, such linearity cannot always be obtained immediately after exposure and emission are started. In this calculation method, since this prediction timing is set outside a nonlinear region, the integral potential does not fall outside the proper exposure range.

The second photometric prediction method in the camera system will be described next with reference to FIG. 23. In this method, integral potentials are measured at predetermined timings.

If integral potentials measured at predetermined timings $t_1, t_2, t_3, \ldots, t_n$ are represented by $V_1, V_2, V_3, \ldots, V_n$, an emission stop timing can be calculated as follows:

prediction between 0 and $t_1 \ldots \quad t_1 + (V_e/V_1) \times t_1$ prediction between $t_1$ and $t_2 \ldots \quad t_2 + ((V_e - V_1)/(V_2 - V_1)) \times (t_2 - t_1)$ prediction between $t_3$ and $t_2 \ldots \quad t_3 + ((V_e - V_2)/(V_3 - V_2)) \times (t_3 - t_2)$ $\vdots$ prediction between $t_{n-1}$ and $t_n \ldots \quad t_n + ((V_e - V_{n-1})/(V_n - V_{n-1})) \times (t_n - t_{n-1})$ In this case, if $t_n - t_{n-1} = \Delta t$, it means that an emission stop timing comes after the elapse of $((V_e - V_{n-1})/(V_n - V_{n-1}))\cdot \Delta t$. Therefore, if the line delay is represented by $t_d$, an emission stop signal is output from the camera main body side at the timing defined by $$t_d = ((V_e - V_{n-1})/(V_n - V_{n-1}))\cdot \Delta t \quad (2)$$

An overall operation of the camera system of the second embodiment will be described below.

This camera system comprises the camera main body 1', the transmitter 3', the receiver 5, and the flash device 7'. The transmitter 3' is mounted on the camera main body 1', and similarly, the flash device 7' is clipped on the receiver 5 (see FIGS. 1A and 1B).

Subsequently, the power switches (not shown) of the respective devices are turned on. At this time, the transmitter 3', the receiver 5, and the flash device 7' operated in accordance wit the flow charts shown in FIGS. 14 to 19 and FIG. 10.

When the camera main body 1' set in a standby state after it is set in a state wherein photography can be performed, the camera main body 1 operates in accordance with the flow charts shown in FIGS. 14 to 16. The camera main body 1' then determines, on the basis of a signal from the terminal WLD, whether the flash device is wireless, or clipped on or wired. If the signal WLD is at "1" level, emission control is performed by using the signals X and TTL as in a normal operation. A case wherein the signal WLD is at "0" level, i.e., a wireless flash device is used, will be described below.

When the wireless flash device is connected, the user can select one of two modes, i.e., the TTL metering mode and the manual emission mode. If the manual emission mode is set, the camera main body 1' inhibits TTL control (by setting TTLena to "0") and sets the flashlight emission mode (by setting F.MD to "0") with respect to the flash device 7' through the transmitter 3' and the receiver 5. In contrast to this, if the TTL metering mode is set, the camera main body 1' permits TTL control (by setting TTLena to "1") and sets the flat emission mode (by setting F.MD to "1").

When the RELSW 2 is depressed, in order to use the single line for emission control, the camera main body 1' transmits the declarator "$" and switches the selector 17 in the transmitter 3' and a selector 21 in the receiver 5 to the path for emission control. Thereafter, a sequence of preparatory operations for exposure is performed. In addition, the camera main body 1' sets the selector signal X.sel to "1" to select the AND/OR gate 44 so as to output a second emission start signal from a terminal X1.

The second emission start signal is output after the elapse of $(t_s-t_d)$ since the front curtain starts to travel. Owing to the channel delay $t_d$, the emission start signal is received by the flash device 7' the time $t_s$ after the front curtain starts to travel, i.e., at the timing when traveling of the front curtain is completed. Since the flash device 7' produces flashlight at this timing, nonuniform exposure can be prevented.

If TTL control is not performed, a shutter speed at which synchronous flash photography can be performed by a wired flash device can also be set in a case wherein a wireless flash device is used.

If TTL control is performed, since the flash device 7' is set in the flat emission mode, and the light amount per unit time is constant, the integration characteristic of the exposure amount is linear. Therefore, the timing $t_e$ of proper exposure can be easily predicted.

If photometric prediction is performed according to the first or second photometric prediction method in the camera system described above, and TTL1 is set to "1" at the timing $(t_e-t_d)$, an emission stop signal is supplied to the flash device 7' after the elapse of $t_d$. That is, the emission of flashlight is stopped at the timing $t_e$ at which proper exposure is attained. Subsequently, similar to a normal photographic operation, the rear curtain starts to travel, and a full-aperture operation, a mirror-down operation, a shutter charge operation, and a film wind-up operation are performed to complete photography.

As has been described above, according to the present invention, there is provided a camera system which can perform emission control and data communication by using one signal path. Therefore, a plurality of transmission/reception systems are not required, and a reduction in space and cost can be achieved. In addition, since an unnecessary large number of channels using, e.g., electromagnetic waves, are not occupied, this camera system is also beneficial for other users. In addition, according to the camera system of the present invention, since the signal path used for emission control is automatically restored to the data communication path a predetermined period of time after the declaration of emission control, no flashlight emission error occurs. Furthermore, according to the camera system of the present invention, since the data communication restoration time Tx can be changed in data communication, the demand for the expansion of the system can be satisfied. In addition, according to the camera system of the present invention, since shutter speeds at which synchronous flash photography can be performed by a wireless flash device and a wired flash device are the same, the user is free from confusion. Moreover, according to the camera system of the present invention, photography can be performed with proper exposure by TTL metering even by using a wireless flash device.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera system comprising:
   a camera main body;
   a flash device;
   transmission means, arranged in said camera main body, for transmitting a signal including at least one of a data communication signal and an emission control signal to said flash device;
   a single communication path through which the signal is transmitted from said camera main body to said flash device;
   reception means, arranged in said flash device, for receiving the signal transmitted from said transmission means through said single communication path;
   emission driving means, arranged in said flash device, for driving said flash device to emit flashlight;
   communication control means arranged in said reception means and having a communication control function;
   first switching means, arranged in said transmission means, for selectively transmitting one of the data communication signal and the emission control signal of the signals output from said camera main body;
   second switching means, arranged in said reception means, for selectively outputting the signal, transmitted from said transmission means to one of said communication control means and said emission driving means;
   first control means, arranged in said transmission means, for normally setting said first switching means to a data communication signal side, and switching said first switching means to an emission control signal side when said communication path is used as a path for emission control on said flash device; and
   second control means, arranged in said reception means, for normally setting said second switching means to a communication control means side, and switching said second switching means to an emission driving means side when data representing that said communication path is used as the path for emission control on said flash device is transmitted from said transmission means.

2. A system according to claim 1, wherein said communication path includes a radio channel.

3. A camera system having a camera main body and a flash device, comprising:
   transmission means, arranged in said camera main body, for transmitting a signal to said flash device;
   a single communication path through which the signal and data are transmitted from said camera main body to said flash device;
   reception means, arranged in said transmission means, for receiving the signal;
   first control means having a function of performing communication control with respect to said flash device;
   second control means for performing emission control with respect to said flash device;
   switching means for selectively outputting the signal, transmitted from said transmission means and received by said reception means, to one of said first control means and said second control means; and
   switching control means for normally setting said switching means to a first control means side, and switching said switching means to a second control means side when data representing that said communication path is used as the path for emission control on said flash device is received, as the signal from said camera main body, by said reception means.

4. A system according to claim 3, wherein said switching control means includes means for restoring said switching means to the first control means side a predetermined period of time after said switching means is switched to the second control means side.

5. A system according to claim 3, wherein said communication path includes a radio channel.

6. A system according to claim 3, wherein communication performed by said first control means includes asynchronous serial digital communication.

7. A system according to claim 4, wherein a time required to restore said switching means to the first control means side is changeable in advance in data communication.

8. A system according to claim 3, wherein transmission of the data representing that said communication path is used as the path for emission control on said flash device is performed in accordance with an operation of a release button of said camera main body.

9. A camera system having a camera main body and a flash device which can be connected to each other by radio, comprising:
   first detection means for detecting, on a camera main body side, that said camera main body and said flash device are connected to each other by radio;
   mode selection means for setting said camera main body in a TTL (Through the Taking Lens) metering mode;
   second detection means for detecting a mode set by said mode selection means;
   direct metering means for setting a light amount through a lens of said camera main body; and
   emission control means for outputting an emission stop signal from the camera main body side to said flash device on the basis of an output value from said direct metering means,
   wherein said emission control means includes means for predicting an emission stop timing from the output value from said direct metering means, when said first detection means detects that said camera main body and said flash device are connected to each other by radio, and said second detection means detects that the TTL metering mode is set, and means for outputting an emission stop signal from the camera main body said to said flash device a predetermined period of time before the predicted timing.

10. A system according to claim 9, wherein said camera main body comprises means for setting a flat emission mode in which an emission amount per unit time is constant, and said emission control means predicts an emission stop timing in the flat emission mode.

11. A system according to claim 9, wherein said emission control means includes means for integrating output values from said direct metering means, and predicting the emission stop timing on the basis of the obtained integral value.

12. A flash device which is operated by a signal transmitted from a camera main body through a single communication path, comprising:
   reception means for receiving the signal transmitted from said camera main body through said communication path;
   first control means having a communication control function;
   second control means for controlling emission;
   switching means for selectively outputting the signal, transmitted from said camera main body and received by said reception means, to one of said first control means and said second control means; and
   switching control means for normally setting said switching means to a first control means side, and switching said switching means to a second control means side when data representing that said communication path is used as a path for emission control on said flash device is received, as the signal from said camera main body, by said reception means.

13. A device according to claim 12, wherein said switching control means comprises means for restoring said switching means to the first control means side a predetermined period of time after said switching means is switched to the second control means side.

14. A camera system comprising:
   a camera main body comprising:
     a) data forming means for forming data associated with photography;
     b) timing signal generating means for generating a timing signal associated with an emission start timing and an emission stop timing of a flash device;
     c) single transmission means for converting one of the data formed by said data forming means and the timing signal generated by said timing signal generating means into an electric wave signal, and transmitting the signal to said flash device;
     d) first switching means, connected to said data forming means and said timing signal generating means, for selectively transferring one of the data and the timing signal to said transmission means; and
     e) first switching control means for controlling said first switching means, and
   said flash device comprising:
     a) signal reception means for receiving the electric wave signal from said transmission means of said camera main body, and converting the electric wave signal into a digital signal;
     b) emission timing control means for controlling an emission timing of said flash device;
     c) flash operation control means for controlling an operation of said flash device;
     d) second switching means, connected to said emission timing control means and said flash operation control means, for selectively transferring the digital signal from said reception means to one of said emission timing control means and said flash operation control means.

15. A system according to claim 14, wherein said first switching control means includes means for controlling said first switching means to transfer the timing signal from said timing signal generating means to said transmission means during at least an exposure operation of said camera main body, and said second switching control means includes means for controlling said second switching means to transfer the digital signal from said reception means to said emission timing control means during at least an exposure operation of said camera main body.

16. A system according to claim 14, wherein said timing signal generating means includes means for generating the timing signal at a timing earlier than a normal emission start timing or emission stop timing of said flash device by a predetermined period of time.

17. A camera system having a camera main body and a flash device which can be connected to each other by radio, comprising:
   detection means for detecting that said camera main body and said flash device are connected to each other by radio;
   first emission start signal generating means for outputting a first emission start signal in accordance with a traveling position of a shutter curtain of said camera main body;
   second emission start signal generating means for generating a second emission start signal at a timing earlier than a timing at which the first emission start signal is output from said first emission start signal generating means, by a predetermined period of time; and
   control means for outputting the second emission start signal generated by said second emission start signal generating means, as an emission signal, to said flash device when said detection means detects that said camera main body and said flash device are connected to each other by radio.

18. A camera system for transmitting a control signal from a camera main body to an external unit by wireless, transmission comprising:
   timing calculating means for calculating a timing at which said camera main body transmits the control signal;
   transmission means for transmitting the control signal to said external unit at the timing calculated by said timing calculating means;
   reception means for receiving the control signal from said transmission means; and
   control means for controlling said external unit on the basis of the control signal from said reception means,
   wherein said timing calculating means calculates a timing, as the transmission timing, earlier than a normal control timing in said external unit by a predetermined period of time in accordance with a time required to transmit the control signal from said transmission means to said control means.

19. A system according to claim 18, wherein said transmission means includes means for transmitting the control signal upon converting the signal into an electric wave signal, and said reception means includes means for outputting the electric wave signal, received from said transmission means, to said control means upon converting the signal into a digital signal.

20. A system according to claim 18, wherein said external unit includes a flash device, and the control signal from said camera main body includes at least one of an emission start signal and an emission stop signal for said flash device.

21. A system according to claim 18, wherein said external unit includes a motor-driven panhead unit, and the control signal from said camera main body includes a signal designating a driving direction of said motor-driven panhead unit.

22. A camera system having a camera main body and a flash device, comprising:
   transmission signal forming means for forming a photographic data signal associated with a photographic operation of said camera main body and a timing signal for emission control on said flash device as transmission signals to be transmitted from said camera main body to said flash device;
   transmission means for transmitting the photographic data signal and the timing signal, formed by said transmission signal forming means, to said flash device upon converting the signals into electric wave signals;
   reception means for receiving the electric wave signals from said transmission means and converting the signals into digital signals; and
   control means for controlling said flash device on the basis of the digital signals from said reception means.

23. A system according to claim 22, wherein said transmission signal forming means includes means for, when the transmission signal is the timing signal, generating the timing signal at a timing earlier than at least one of an emission start timing and an emission stop timing in said flash device by a predetermined period of time.

24. A system according to claim 22, wherein said transmission signal forming means includes means for, when the transmission signal is the photographic data signal, forming an emission mode designating signal designating an emission mode in said flash device.

25. A camera system having a camera main body and an external unit, comprising:
   transmission signal forming means for forming a photographic data signal associated with a photographic operation of said camera main body and a timing signal for controlling said external unit as transmission signals to be transmitted from said camera main body to said external unit;
   transmission means for transmitting the photographic data signal and the timing signal, formed by said transmission signal forming means, to said external unit upon converting the signal into electric wave signals;
   reception means for receiving the electric wave signals from said transmission means and converting the signals into digital signals; and
   control means for controlling said external unit on the basis of the digital signals from said reception means.

26. A system according to claim 25, wherein said transmission signal forming means includes means for, when the transmission signal is the timing signal, generating the timing signal at a timing earlier than a normal control timing in said external unit by a predetermined period of time in accordance with a time required to transmit the timing signal from said transmission signal forming means to said control means.

27. A system according to claim 25, wherein said control means includes means for initializing said external unit in a predetermined state when the transmission signal is the photographic data signal and the photographic data signal is predetermined data.

* * * * *